US012770599B2

(12) United States Patent
Saino et al.

(10) Patent No.: US 12,770,599 B2
(45) Date of Patent: Oct. 20, 2026

(54) AUDIO PROCESSING METHOD, AUDIO PROCESSING SYSTEM, AND RECORDING MEDIUM

(71) Applicant: YAMAHA CORPORATION, Hamamatsu (JP)

(72) Inventors: Keijiro Saino, Hamamatsu (JP); Ryunosuke Daido, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 987 days.

(21) Appl. No.: 18/076,739

(22) Filed: Dec. 7, 2022

(65) Prior Publication Data

US 2023/0098145 A1 Mar. 30, 2023

Related U.S. Application Data

(63) Continuation of application No. PCT/JP2021/021691, filed on Jun. 8, 2021.

(Continued)

(30) Foreign Application Priority Data

Jul. 31, 2020 (JP) ................................ 2020-130738

(51) Int. Cl.

*G10H 7/00* (2006.01)
*G10G 1/04* (2006.01)
*G10H 1/00* (2006.01)

(52) U.S. Cl.

CPC .............. *G10H 7/002* (2013.01); *G10G 1/04* (2013.01); *G10H 1/0008* (2013.01);

(Continued)

(58) Field of Classification Search

CPC .... G10H 7/002; G10H 1/0008; G10H 1/0041; G10H 2210/086; G10H 2250/311; G10G 1/04

(Continued)

(56) References Cited

U.S. PATENT DOCUMENTS

| | | | | |
|---|---|---|---|---|
| 10,068,557 | B1 * | 9/2018 | Engel .................. | G10H 1/0041 |
| 2011/0203445 | A1 | 8/2011 | Stanger Ramirez | |
| 2021/0151014 | A1 | 5/2021 | Maezawa | |

FOREIGN PATENT DOCUMENTS

| | | | |
|---|---|---|---|
| CN | 107077837 | A | 8/2017 |
| EP | 3208795 | A1 | 8/2017 |

(Continued)

OTHER PUBLICATIONS

Kim et al. "Neural Music Sythesis for Flexible Timbre Control" arxiv.org, Cornell University Library, 201 Olin Library Cornell University Ithaca, NY 14853, XP081044656. Nov. 1, 2018: pp. 1-5. ( Year: 2018).*

(Continued)

*Primary Examiner* — Jianchun Qin
(74) *Attorney, Agent, or Firm* — ROSSI, KIMMS & McDOWELL LLP

(57) ABSTRACT

An audio processing method, for each time step of a plurality of time steps on a time axis: acquires encoded data that reflects current musical features of a tune for a current time step and musical features of the tune for succeeding time steps succeeding the current time step; acquires control data according to a real-time instruction provided by a user; and generates acoustic feature data representative of acoustic features of a synthesis sound in accordance with first input data including the acquired encoded data and the acquired control data.

20 Claims, 14 Drawing Sheets

Related U.S. Application Data

(60) Provisional application No. 63/036,459, filed on Jun. 9, 2020.

(52) U.S. Cl.
CPC ..... *G10H 1/0041* (2013.01); *G10H 2210/086* (2013.01); *G10H 2250/311* (2013.01)

(58) Field of Classification Search
USPC .......................................................... 84/609
See application file for complete search history.

(56) References Cited

FOREIGN PATENT DOCUMENTS

| | | | |
|---|---|---|---|
| JP | 6583756 | B1 | 10/2019 |
| WO | 2020031544 | A1 | 2/2020 |

OTHER PUBLICATIONS

International Search Report issued in International Application No. PCT/JP2021/021691 mailed Sep. 7, 2021. English translation provided.
Written Opinion issued in International Application No. PCT/JP2021/021691 mailed Sep. 7, 2021.
Aaron Van Den Oord. "Wavenet: A Generative Model for Raw Audio" arXiv:1609.03499v2, Sep. 19, 2016, pp. 1-15. Cited in specification.
Merlijn Blaauw. "A Neural Parametric Singing Synthesizer." arXiv:1704.03809v3, Aug. 17, 2017, pp. 1-9. Cited in specification.
Extended European search report issued in European Appln. No. 21823051.4, mailed on Jul. 1, 2024.
Kim et al. "Neural Music Sythesis for Flexible Timbre Control" arxiv.org, Cornell University Library, 201 Olin Library Cornell University Ithaca, NY 14853, XP081044656. Nov. 1, 2018: pp. 1-5.
Jonason "The control-synthesis approach for making expressive and controllable neural music synthesizers" KTH Royal Institute of Technology School of Electrical Engineering and Computer Science, XP093176881. Oct. 13, 2020: pp. 1-23. Retrieved from the Internet: URL:https://www.diva-portal.org/smash/get/diva2:1510072/FULLTEXT01.pdf [retrieved on Jun. 19, 2024].
Second Office Action issued in Chinese Appln. No. 202180040942.0 mailed Dec. 17, 2025. English machine translation provided.
English translation of Written Opinion issued in Intl. Appln. No. PCT/JP2021/021691 mailed on Sep. 7, 2021 previously cited in IDS filed Dec. 7, 2022.
Office Action issued in Chinese Appln. No. 202180040942.0 mailed on Aug. 26, 2025. English machine translation provided.
Office Action issued in Chinese Appln. No. 202180040942.0 mailed on Apr. 28, 20026.

* cited by examiner

B
Q
G
P
E
Z1
C
F
D
d1
d2
d3
Sa22
Sa25
Sb21
Sb22
Sb23
Ra
Rb
dh
aw
w
ah
n
z
sil
hh
24
72
F#3
B3
C#4
the ones__ who

AUDIO PROCESSING METHOD, AUDIO PROCESSING SYSTEM, AND RECORDING MEDIUM

CROSS REFERENCE TO RELATED APPLICATIONS

This application is a Continuation Application of PCT Application No. PCT/JP2021/021691, filed on Jun. 8, 2021, and is based on and claims priority from U.S. Provisional Application 63/036,459, filed on Jun. 9, 2020, and Japanese Patent Application No. 2020-130738, filed on Jul. 31, 2020, the entire contents of each of which are incorporated herein by reference.

TECHNICAL FIELD

The present disclosure relates to audio processing.

BACKGROUND

Various techniques for synthesizing musical sounds such as singing voice sounds and instrumental sounds have been proposed. Non-Patent Document 1 and Non-Patent Document 2 each disclose techniques for generating samples of an audio signal by synthesis processing in each time step using a deep neural network (DNN).

Non-Patent Document 1 Van Den Oord, Aaron, et al. "WAVENET: A GENERATIVE MODEL FOR RAW AUDIO" arXiv: 1609.03499v2(2016)

Non-Patent Document 2 Blaauw, Merlijn, and Jordi Bonada. "A NEURAL PARAMETRIC SINGING SYNTHESIZER" arXiv preprint arXiv: 1704.03809v3 (2017)

SUMMARY

According to the technique disclosed in Non-Patent Document 1 or Non-Patent Document 2, each of samples of an audio signal is generated based on features in time steps succeeding a current time step of a tune. However, it is difficult to generate a synthesis sound that reflects a real-time instruction by a user in parallel with the generation of the samples. In consideration of the situation above, an object of an aspect of the present disclosure is to generate a synthesis sound based on features of a tune in time steps succeeding a current time step, and a real-time instruction provided by a user.

In order to solve the problem described above, an acoustic processing method according to an aspect of the present disclosure includes: for each time step of a plurality of time steps on a time axis: acquiring encoded data that reflects current musical features of a tune for a current time step and musical features of the tune for succeeding time steps succeeding the current time step; acquiring control data according to a real-time instruction provided by a user; and generating acoustic feature data representative of acoustic features of a synthesis sound in accordance with first input data including the acquired encoded data and the acquired control data.

An acoustic processing system according to an aspect of the present disclosure includes: one or more memories storing instructions; and one or more processors that implements the instructions to perform a plurality of tasks, including, for each time step of a plurality of time steps on a time axis: an encoded data acquiring task that acquires encoded data that reflects current musical features of a tune for a current time step and musical features of the tune for succeeding time steps succeeding the current time step; a control data acquiring task that acquires control data according to a real-time instruction provided by a user; and an acoustic feature data generating task that generates acoustic feature data representative of acoustic features of a synthesis sound in accordance with first input data including the acquired encoded data and the acquired control data.

A computer-readable recording medium according to an aspect of the present disclosure stores a program executable by a computer to execute an audio processing method comprising, for each time step of a plurality of time steps on a time axis: acquiring encoded data that reflects current musical features of a tune for a current time step and musical features of the tune for succeeding time steps succeeding the current time step; acquiring control data according to a real-time instruction provided by a user; and generating acoustic feature data representative of acoustic features of a synthesis sound in accordance with first input data including the acquired encoded data and the acquired control data.

DETAILED DESCRIPTION OF THE EMBODIMENTS

A: First Embodiment

Figure 1:
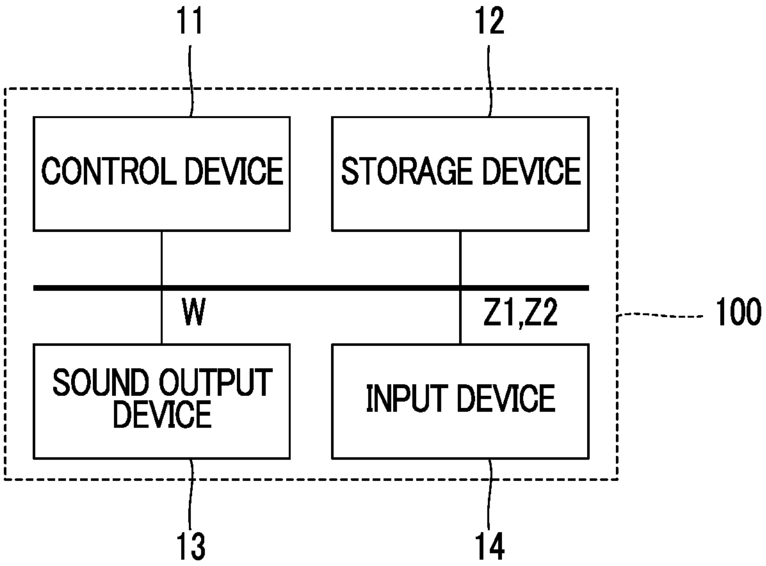
FIG. 1 is a block diagram illustrating a configuration of an audio processing system according to a first embodiment.

FIG. 1 is a block diagram illustrating a configuration of an audio processing system 100 according to a first embodiment of the present disclosure. The audio processing system 100 is a computer system that generates an audio signal W representative of a waveform of a synthesis sound. The synthesis sound is, for example, an instrumental sound produced by a virtual performer playing an instrument, or a singing voice sound produced by a virtual singer singing a tune. The audio signal W is constituted of a series of samples.

The audio processing system 100 includes a control device 11, a storage device 12, a sound output device 13, and an input device 14. The audio processing system 100 is implemented by an information apparatus, such as a smartphone, an electronic tablet, or a personal computer. In addition to being implemented by use of a single apparatus, the audio processing system 100 can also be implemented by physically separate apparatuses (for example, those comprising a client-server system).

The storage device 12 is one or more memories that store programs to be executed by the control device 11 and various kinds of data to be used by the control device 11. For example, the storage device 12 comprises a known recording medium, such as a magnetic recording medium or a semiconductor recording medium, or is constituted of a combination of several types of recording media. In addition, the storage device 12 can comprise a portable recording medium that is detachable from the audio processing system 100, or a recording medium (for example, cloud storage) to and from which data can be written and read via a communication network.

Figure 2:
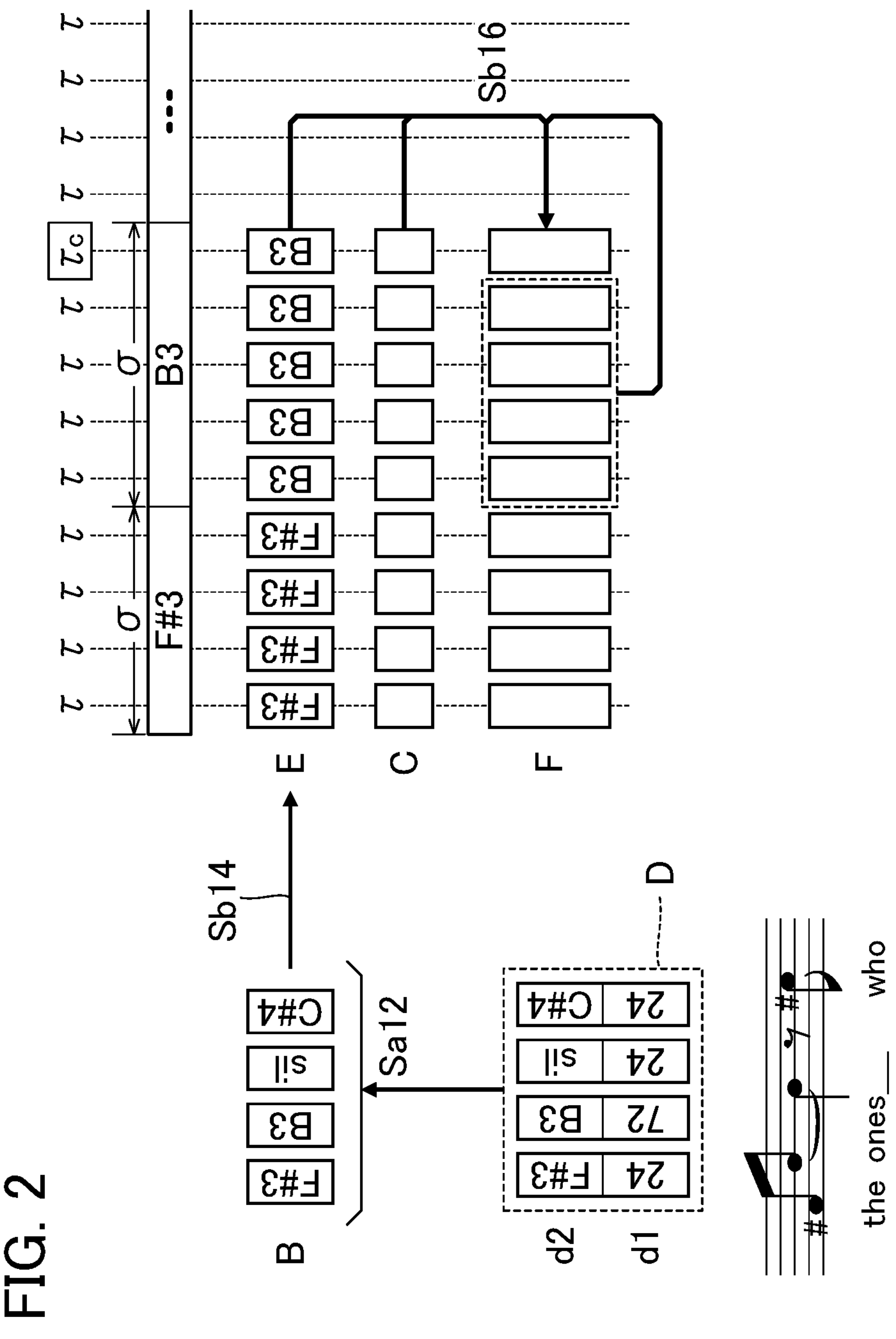
FIG. 2 is an explanatory diagram of an operation (synthesis of an instrumental sound) of the audio processing system.
Figure 3:
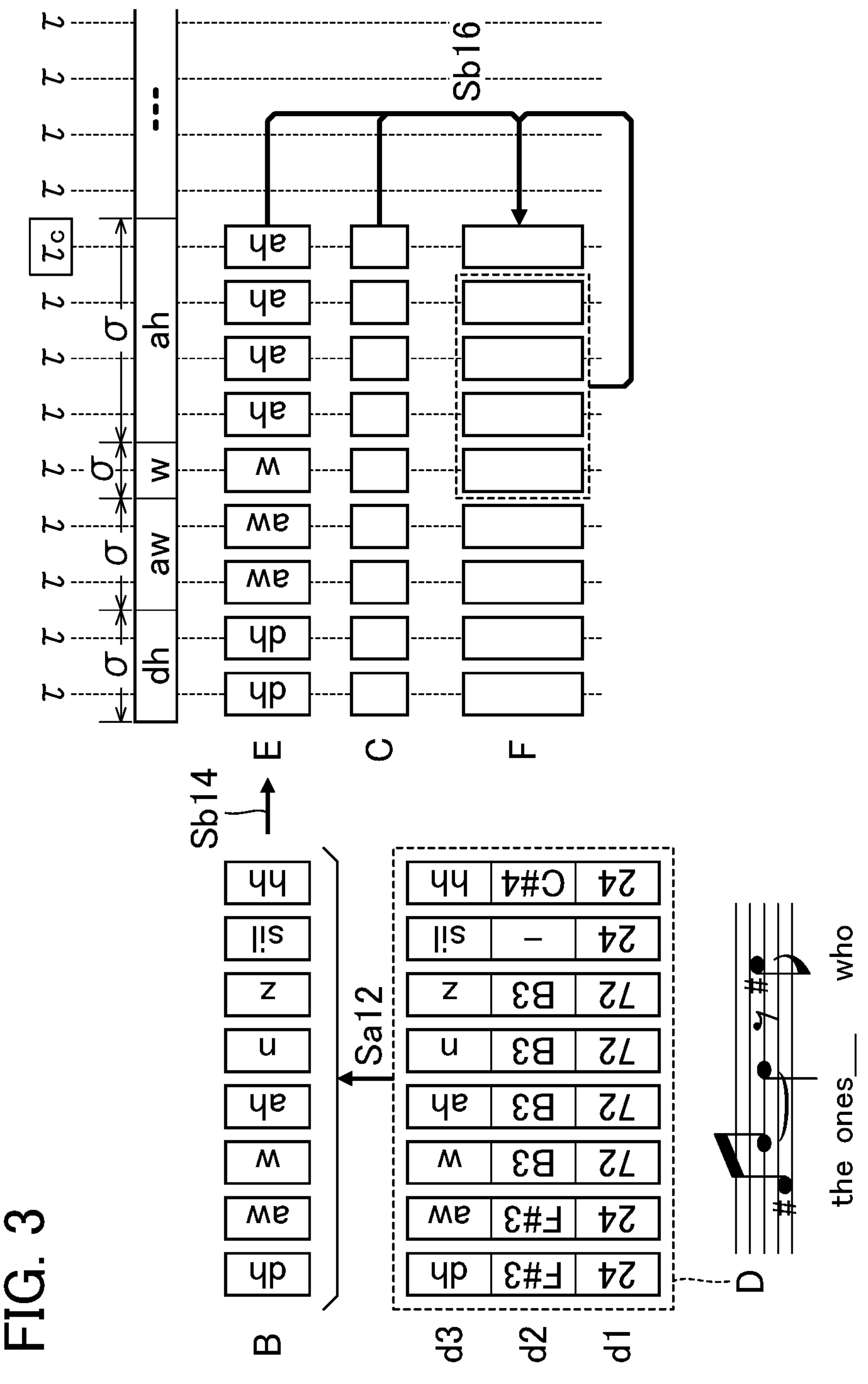
FIG. 3 is an explanatory diagram of an operation (synthesis of a singing voice) of the audio processing system.

The storage device 12 stores music data D representative of content of a tune. FIG. 2 illustrates music data D that is used to synthesize an instrumental sound, and FIG. 3 illustrates music data D used to synthesize a singing voice sound. The music data D represents a series of symbols that constitute the tune. Each symbol is either a note or a phoneme. The music data D for the synthesis of an instrumental sound designates a duration d1 and a pitch d2 for each of symbols (specifically, music notes) that make up the tune. The music data D for the synthesis of a singing voice designates a duration d1, a pitch d2, and a phoneme code d3 for each of the symbols (specifically, phonemes) that make up the tune. The duration d1 designates a length of a note in the number of beats using, for example, a tick value that is independent of a tempo of the tune. The pitch d2 designates a pitch by, for example, a note number. The phoneme code d3 identifies a phoneme. A phoneme /sil/ shown in FIG. 3 represents no sound. The music data D is data representing a score of the tune.

The control device 11 shown in FIG. 1 is one or more processors that control each element of the audio processing system 100. Specifically, the control device 11 is one or more types of processors, such as a CPU (Central Processing Unit), an SPU (Sound Processing Unit), a DSP (Digital Signal Processor), an FPGA (Field Programmable Gate Array), or an ASIC (Application Specific Integrated Circuit). The control device 11 generates an audio signal W from music data D stored in the storage device 12.

The sound output device 13 reproduces a synthesis sound represented by the audio signal W which is generated by the control device 11. The sound output device 13 is, for example, a speaker or headphones. For brevity, a D/A converter that converts the audio signal W from digital to analog and an amplifier that amplifies the audio signal W are not shown in the drawings. In addition, FIG. 1 shows a configuration in which the sound output device 13 is mounted to the audio processing system 100. However, the sound output device 13 may be separate from the audio processing system 100 and connected thereto either by wire or wirelessly.

The input device 14 accepts an instruction from a user. For example, the input device 14 may comprise multiple controls to be operated by the user or a touch panel that detects a touch by the user. An input device including a control (e.g., a knob, a pedal, etc.), such as a MIDI (Musical Instrument Digital Interface) controller, may be used as the input device 14.

By the user operating the input device 14, the user can designate a condition for a synthesis sound to the audio processing system 100. Specifically, the user can designate an indication value Z1 and a tempo Z2 of the tune. The indication value Z1 according to the first embodiment is a numerical value that represents an intensity (dynamics) of a synthesis sound. The indication value Z1 and the tempo Z2 are designated in real time in parallel with generation of the audio signal W. The indication value Z1 and the tempo Z2 vary continuously on a time axis responsive to instructions of the user. The user may designate the tempo Z2 in any manner. For example, the tempo Z2 may be specified based on a period of repeated operations on the input device 14 by the user. Alternatively, the tempo Z2 may be specified based on performance of the instrument by the user or a singing voice by the user.

Figure 4:
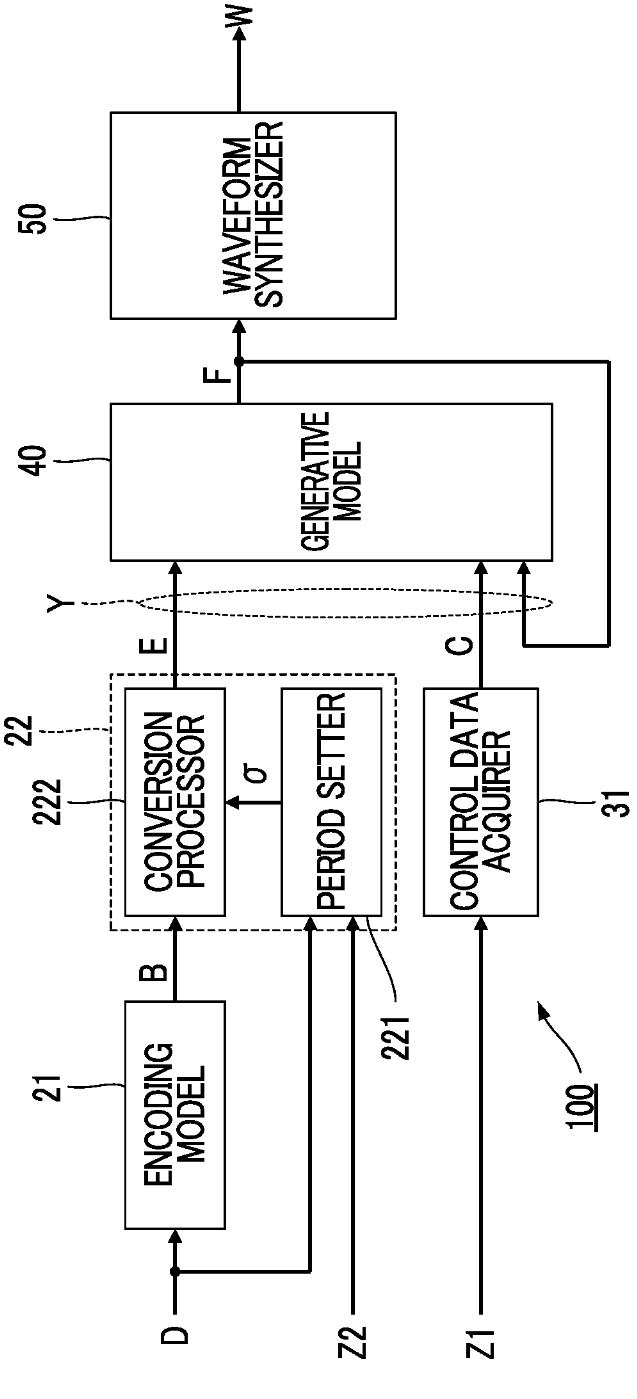
FIG. 4 is a block diagram illustrating a functional configuration of the audio processing system.

FIG. 4 is a block diagram illustrating a functional configuration of the audio processing system 100. By executing programs in the storage device 12, the control device 11 implements a plurality of functions (an encoding model 21, an encoded data acquirer 22, a control data acquirer 31, a generative model 40, and a waveform synthesizer 50) for generating the audio signal W from the music data D.

The encoding model 21 is a statistical estimation model for generating a series of symbol data B from the music data D. As illustrated as step Sa12 in FIG. 2 and FIG. 3, the encoding model 21 generates symbol data B for each of symbols that constitute the tune. In other words, a piece of symbol data B is generated for each symbol (each note or each phoneme) of the music data D. Specifically, the encoding model 21 generates the piece of symbol data B for each one symbol based on the one symbol and symbols before and after the one symbol. A series of the symbol data B for the entire tune is generated from the music data D. Specifically, the encoding model 21 is a trained model that has learned a relationship between the music data D and the series of symbol data B.

A piece of symbol data B for one symbol (one note or one phoneme) of the music data D changes in accordance not only with features (the duration d1, the pitch d2, and the phoneme code d3) designated for the one symbol but also in accordance with musical features designated for each symbol preceding the one symbol (past symbols) and musical features of each symbol succeeding the one symbol (future symbols) in the tune. The series of the symbol data B generated by the encoding model 21 is stored in the storage device 12.

The encoding model 21 may be a deep neural network (DNN). For example, the encoding model 21 may be a deep neural network with any architecture such as a convolutional neural network (CNN) or a recurrent neural network (RNN). An example of the recurrent neural network is a bi-directional recurrent neural network (bi-directional RNN). The encoding model 21 may include an additional element, such as a long short-term memory (LSTM) or self-attention. The encoding model 21 exemplified above is implemented by a combination of a program that causes the control device 11 to execute the generation of the plurality of symbol data B from the music data D and a set of variables (specifically, weighted values and biases) to be applied to the generation. The set of variables that defines the encoding model 21 is determined in advance by machine learning using a plurality of training data and is stored in the storage device 12.

As illustrated in FIG. 2 or FIG. 3, the encoded data acquirer 22 sequentially acquires encoded data E at each time step T of a time series of time steps T on the time axis. Each of time steps T is a time point discretely set at regular intervals (for example, 5 millisecond intervals) on the time axis. As illustrated in FIG. 4, the encoded data acquirer 22 includes a period setter 221 and a conversion processor 222.

The period setter 221 sets, based on the music data D and the tempo Z2, a period (hereinafter, referred to as a "unit period") σ during which each symbol in the tune is sounded. Specifically, the period setter 221 sets a start time and an end time of the unit period σ for each of the plurality of symbols of the tune. For example, a length of each unit period σ is determined in accordance with the duration d1 designated by the music data D for each symbol and the tempo Z2 designated by the user using the input device 14. As illustrated in FIG. 2 or FIG. 3, each unit period σ includes one or more time steps T on the time axis.

A known analysis technique may be adopted to determine each unit period σ. For example, a function (G2P: Grapheme-to-Phoneme) of estimating a duration of each phoneme using a statistical estimation model, such as a hidden Markov model (HMM), or a function of estimating a duration of the phoneme using a trained (well-trained) statistical estimation model, such as a deep neural network, is used as the period setter 221. The period setter 221 generates information (hereinafter, referred to as "mapping information") representative of a correspondence between each unit period σ and encoded data E of each time step T.

As illustrated as step Sb14 in FIG. 2 or FIG. 3, the conversion processor 222 acquires encoded data E at each time step T on the time axis. In other words, the conversion processor 222 selects each time step T as a current step τc in a chronological order of the time series and generates the encoded data E for the current step τc. Specifically, using the mapping information, i.e., a result of determination of each unit period σ by the period setter 221, the conversion processor 222 converts the symbol data B for each symbol stored in the storage device 12 into encoded data E for each time step T on the time axis. In other words, using the symbol data B generated by the encoding model 21 and the mapping information generated by the period setter 221, the conversion processor 222 generates the encoded data E for each time step τ on the time axis. A single piece of symbol data B for a single symbol is expanded to multiple pieces of encoded data E for multiple time steps τ. However, for example, when the duration d1 is extremely short, a piece of symbol data B for a single symbol may be converted to a piece of encoded data E for a single time step τ.

For example, a deep neural network may be used to convert the symbol data B for each symbol into the encoded data E for each time step τ. For example, the conversion processor 222 generates the encoded data E, using a deep neural network such as a convolutional neural network or a recurrent neural network.

As will be understood from the description given above, the encoded data acquirer 22 acquires the encoded data E at each of the time steps τ. As described earlier, each piece of symbol data B for one symbol in a tune changes in accordance not only with features designated for the one symbol but also features designated for symbols preceding the one symbol and features designated for symbols succeeding the one symbol. Therefore, among the symbols (notes or phonemes) of the music data D, the encoded data E for the current step τc changes in accordance with features (d1 to d3) of one symbol corresponding to the current step τc and features (d1 to d3) of symbols before and after the one symbol.

The control data acquirer 31 shown in FIG. 4 acquires control data C at each of the time steps τc. The control data C reflects an instruction provided in real time by the user by operating the input device 14. Specifically, the control data acquirer 31 sequentially generates control data C, at each time step τ, representing an indication value Z1 provided by the user. Alternatively, the tempo Z2 may be used as the control data C.

The generative model 40 generates acoustic feature data F at each of the time steps τ. The acoustic feature data F represents acoustic features of a synthesis sound. Specifically, the acoustic feature data F represents frequency characteristics, such as a mel-spectrum or an amplitude spectrum, of the synthesis sound. In other words, a time series of the acoustic feature data F corresponding to different time steps T is generated. Specifically, the generative model 40 is a statistical estimation model that generates the acoustic feature data F of the current step τc based on input data Y of the current step τc. Thus, the generative model 40 is a trained model that has learned a relationship between the input data Y and the acoustic feature data F. The generative model 40 is an example of a "first generative model."

The input data Y of the current step τc includes the encoded data E acquired by the encoded data acquirer 22 at the current step τc and the control data C acquired by the control data acquirer 31 at the current step τc. In addition, the input data Y of the current step τc can include acoustic feature data F generated by the generative model 40 at each of the latest time steps T preceding to the current step τc. In other words, the acoustic feature data F already generated by the generative model 40 is fed back to input of the generative model 40.

As understood from the description given above, the generative model 40 generates the acoustic feature data F of the current step τc based on the encoded data E of the current time step τc, the control data C of the current step τc, and the acoustic feature data F of past time steps T (step Sb16 in FIG. 2 and FIG. 3). In the first embodiment, the encoding model 21 functions as an encoder that generates the series of symbol data B from the music data D, and the generative model 40 functions as a decoder that generates the time series of acoustic feature data F from the time series of encoded data E and the time series of control data C. The input data Y is an example of "first input data."

The generative model 40 may be a deep neural network. For example, a deep neural network such as a causal convolutional neural network or a recurrent neural network is used as the generative model 40. The recurrent neural network is, for example, a unidirectional recurrent neural network. The generative model 40 may include an additional element, such as a long short-term memory or self-attention. The generative model 40 exemplified above is implemented by a combination of a program that causes the control device 11 to execute the generation of the acoustic feature data F from the input data Y and a set of variables (specifically, weighted values and biases) to be applied to the generation. The set of variables, which defines the generative model 40, is determined in advance by machine learning using a plurality of training data and is stored in the storage device 12.

As described above, in the first embodiment, the acoustic feature data F is generated by supplying the input data Y to a trained generative model 40. Therefore, statistically proper acoustic feature data F can be generated under a latent tendency of a plurality of training data used in machine learning.

The waveform synthesizer 50 shown in FIG. 4 generates an audio signal W of a synthesis sound from a time series of acoustic feature data F. The waveform synthesizer 50 generates the audio signal W by, for example, converting frequency characteristics represented by the acoustic feature data F into waveforms in a time domain by calculations including inverse discrete Fourier transform, and concatenating the waveforms of consecutive time steps τ. A deep neural network (a so-called neural vocoder) that learns a relationship between acoustic feature data F and a time series of samples of audio signals W may be used as the waveform synthesizer 50. An audio signal W is represented by a time series of samples obtained by sampling a sound wave every sampling interval, a reciprocal of which is the sampling frequency. The sampling interval is shorter than the respective interval of the time steps τ. By supplying the sound output device 13 with the audio signal W generated by the waveform synthesizer 50, a synthesis sound is produced from the sound output device 13.

Figure 5:
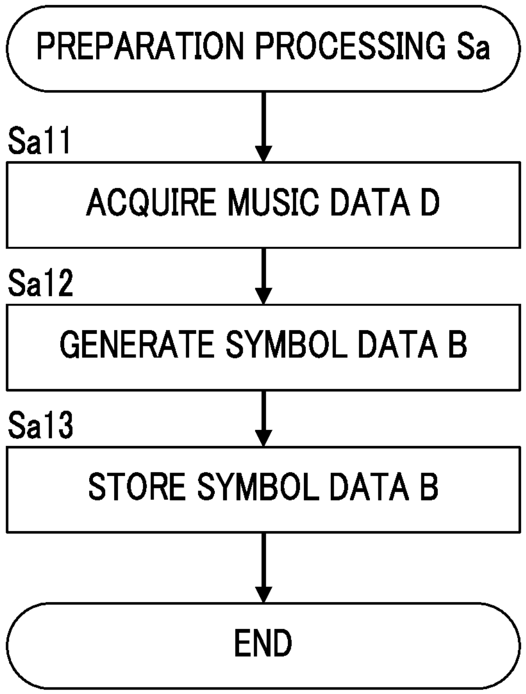
FIG. 5 is a flow chart illustrating example procedures of preparation processing.

FIG. 5 is a flow chart illustrating example procedures of processing (hereinafter, referred to as "preparation processing") Sa by which the control device 11 generates a series of symbol data B from music data D. The preparation processing Sa is executed each time the music data D is updated. For example, each time the music data D is updated in response to an edit instruction from the user, the control device 11 executes the preparation processing Sa on the updated music data D.

Once the preparation processing Sa is started, the control device 11 acquires music data D from the storage device 12 (Sa11). As illustrated in FIG. 2 and FIG. 3, the control device 11 generates symbol data B corresponding to different symbols in a tune by supplying the encoding model 21 with the music data D representing a series of symbols (a series of notes or a series of phonemes) (Sa12). Specifically, a series of symbol data B for the entire tune is generated. The control device 11 stores the series of symbol data B generated by the encoding model 21 in the storage device 12 (Sa13).

Figure 6:
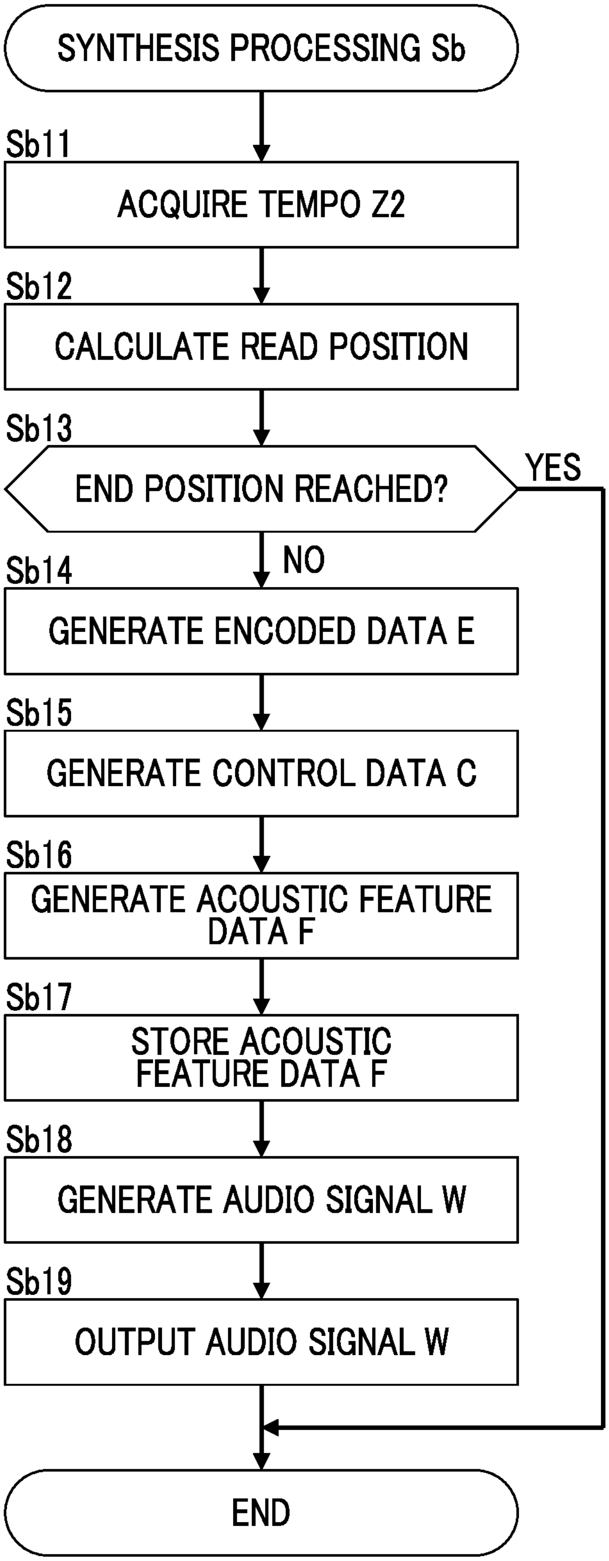
FIG. 6 is a flow chart illustrating example procedures of synthesis processing.

FIG. 6 is a flow chart illustrating example procedures of processing (hereinafter, referred to as "synthesis processing") Sb by which the control device 11 generates an audio signal W. After the series of symbol data B are generated by the preparation processing Sa, the synthesis processing Sb is executed at each of the time steps T on the time axis. In other words, each of the time steps τ is selected as a current step τc in a chronological order of the time series, and the following synthesis processing Sb is executed for the current step τc. By the user operating the input device 14, the user is able to designate an indication value Z1 at any time point during repetition of the synthesis processing Sb.

Once the synthesis processing Sb is started, the control device 11 acquires a tempo Z2 designated by the user (Sb11). In addition, the control device 11 calculates a position (hereinafter, referred to as a "read position") in the tune, corresponding to the current step τc (Sb12). The read position is determined in accordance with the tempo Z2 acquired at step Sb11. For example, the faster the tempo Z2, the faster a progress of the read position in the tune for each execution of the synthesis processing Sb. The control device 11 determines whether the read position has reached an end position of the tune (Sb13).

When it is determined that the read position has reached the end position (Sb13: YES), the control device 11 ends the synthesis processing Sb. On the other hand, when it is determined that the read position has not reached the end position (Sb13: NO), the control device 11 (the encoded data acquirer 22) generates encoded data E that corresponds to the current step τc for symbol data B that corresponds to the read position, from among the plurality of symbol data B stored in the storage device 12 (Sb14). In addition, the control device 11 (the control data acquirer 31) acquires control data C that represents the indication value Z1 for the current step τc (Sb15).

The control device 11 generates the acoustic feature data F of the current step τc by supplying the generative model 40 with the input data Y of the current step τc (Sb16). As described earlier, the input data Y of the current step τc includes the symbol data B and the control data C acquired for the current step τc and the acoustic feature data F generated by the generative model 40 for multiple past time steps τ. The control device 11 stores the acoustic feature data F generated for the current step τc in the storage device 12 (Sb17). The acoustic feature data F stored in the storage device 12 is used in the input data Y in next and subsequent executions of the synthesis processing Sb.

The control device 11 (the waveform synthesizer 50) generates a series of samples of the audio signal W from the acoustic feature data F of the current step τc (Sb18). In addition, the control device 11 supplies the audio signal W of the current step τc following the audio signal W of an immediately-previous time step τ, to the sound output device 13 (Sb19). By repeatedly executing the synthesis processing Sb exemplified above for each time step τ, synthesis sounds for the entire tune are produced from the sound output device 13.

As described above, in the first embodiment, the acoustic feature data F is generated using the encoded data E that reflects features of the tune of time steps succeeding the current step τc and the control data C that reflects an indication provided by the user for the current step τc. Therefore, the acoustic feature data F of a synthesis sound that reflects features of the tune in time steps succeeding the current step τc (features in future time steps τ) and a real-time instruction provided by the user can be generated.

Further, the input data Y used to generate the acoustic feature data F includes the acoustic feature data F of past time steps τ as well as the control data C and the encoded data E of the current step τc. Therefore, in a synthesis sound represented by the acoustic feature data F generated, temporal transitions of which sound natural.

By a conventional configuration in which the audio signal W is generated solely from music data D, it is difficult for the user to control acoustic characteristics of a synthesis sound with high temporal resolution. In the first embodiment, the audio signal W that reflects instructions provided by the user can be generated. In other words, the present embodiment provides an advantage in that acoustic characteristics of the audio signal W can be controlled with high temporal resolution in response to an instruction from the user. In a conventional configuration, it may be possible to control directly acoustic characteristics of the audio signal W generated by the audio processing system 100 in response to an instruction from the user. Unlike it, in the first embodiment, the acoustic characteristics of a synthesis sound are controlled by supplying the generative model 40 with the control data C reflecting an instruction provided by the user. Therefore, the present embodiment has an advantage in that the acoustic characteristics of a synthesis sound can be controlled under a latent tendency (tendency of acoustic characteristics that reflect an instruction from the user) of a plurality of training data used in machine learning, in response to an instruction from the user.

Figure 7:
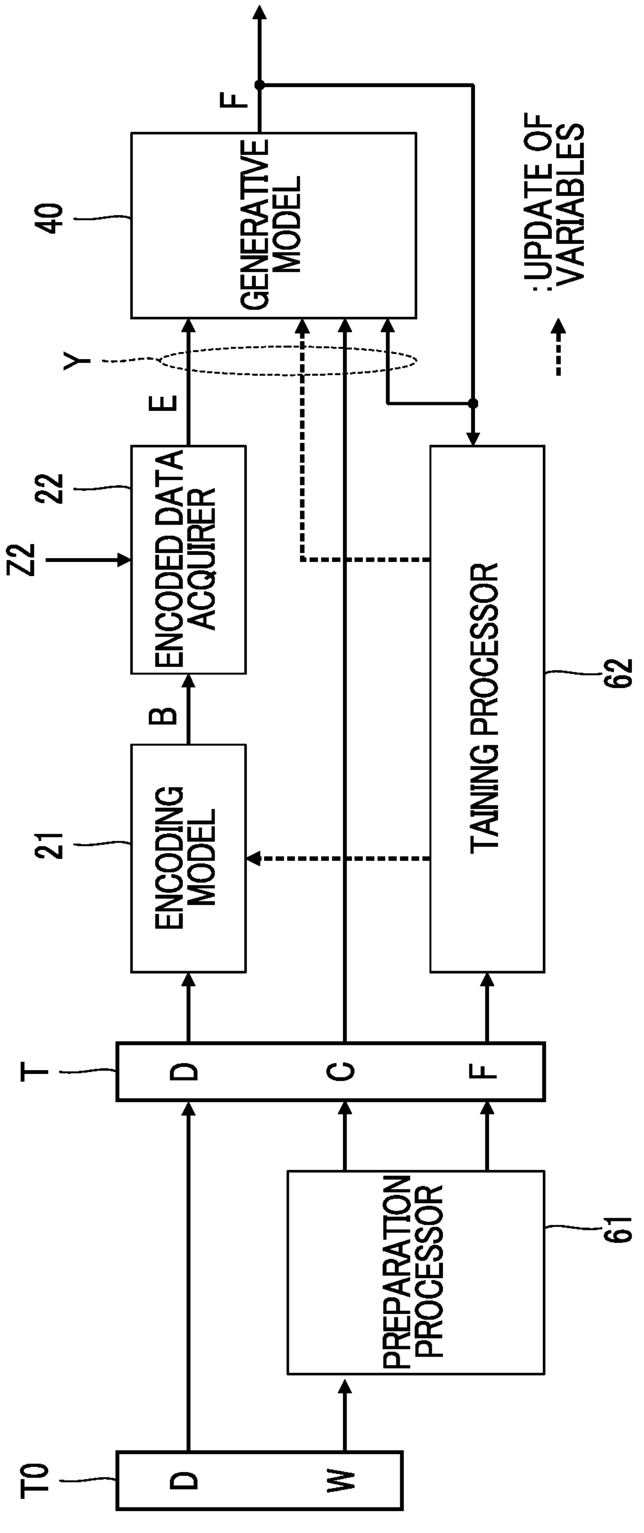
FIG. 7 is an explanatory diagram of training processing.

FIG. 7 is an explanatory diagram of processing (hereinafter, referred to as "training processing") Sc for establishing the encoding model 21 and the generative model 40. The training processing Sc is a kind of supervised machine learning in which a plurality of training data T prepared in advance is used. Each of the plurality of training data T includes music data D, a time series of control data C, and a time series of acoustic feature data F. The acoustic feature data F of each training data T is ground truth data of acoustic features (for example, frequency characteristics) for a synthesis sound to be generated from each of corresponding music data D and control data C of the training data T.

By executing a program stored in the storage device 12, the control device 11 functions as a preparation processor 61 and a training processor 62 in addition to each element illustrated in FIG. 4. The preparation processor 61 generates training data T from reference data T0 in the storage device 12. Multiple training data T is generated from multiple reference data T0. Each piece of reference data T0 includes a piece of music data D and an audio signal W. The audio signal W in each piece of reference data T0 represents a waveform of a tune (hereinafter, referred to as a "reference sound") that corresponds to the piece of music data D in the piece of reference data T0. For example, the audio signal W is obtained by recording the reference sound (instrumental sound or singing voice sound) produced by playing a tune represented by the music data D. A plurality of reference data T0 is prepared from a plurality of tunes. Accordingly, the prepared training data T includes two or more training data sets T corresponding to two or more tunes.

By analyzing the audio signal W of each piece of reference data T0, the preparation processor 61 generates a time series of control data C and a time series of acoustic feature data F of the training data T. For example, the preparation processor 61 calculates a series of indication values Z1 each value of which represents an intensity of a signal in the audio signal W (intensities of the reference sound) and generates the time series of control data C each of which represents the indication values Z1 for each of time steps τ. In addition, the preparation processor 61 may estimate a tempo Z2 from the audio signal W, to generate the series of control data C each of which represents the tempo Z2.

Besides, the preparation processor 61 calculates a time series of frequency characteristics (for example, mel-spectrum or amplitude spectrum) of the audio signal W and generates for each time step τ acoustic feature data F that represents the frequency characteristics. For example, a known frequency analysis technique, such as discrete Fourier transform, can be used to calculate the frequency characteristics of the audio signal W. The preparation processor 61 generates the training data T by aligning, the music data D, with the time series of control data C and the time series of acoustic feature data F that are generated by the procedures described above. The plurality of training data T generated by the preparation processor 61 is stored in the storage device 12.

Figure 8:
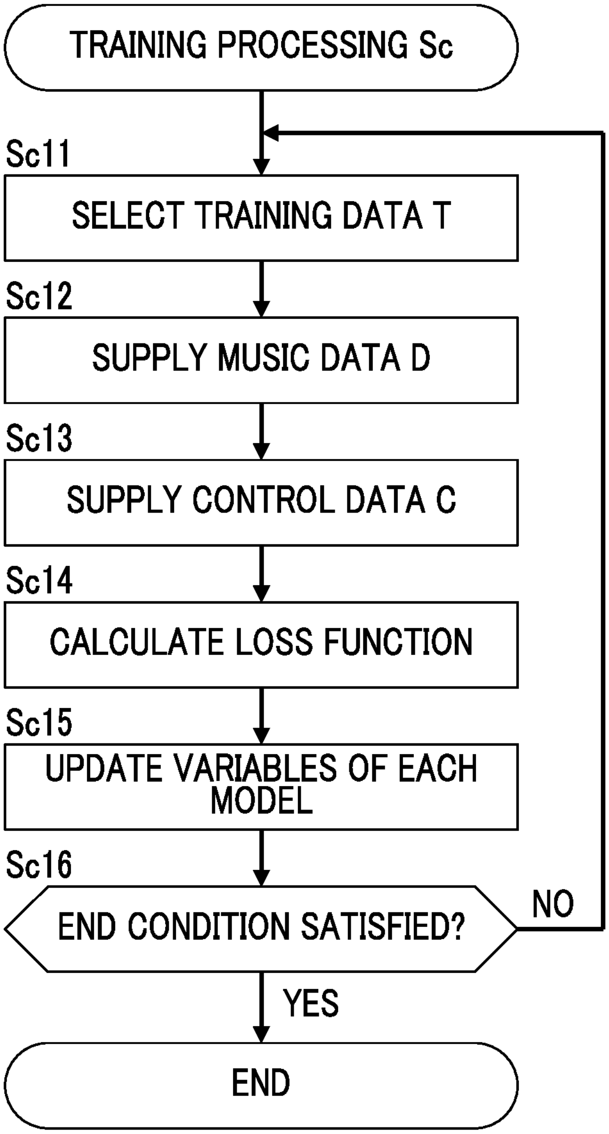
FIG. 8 is a flow chart illustrating example procedures of the training processing.

The training processor 62 establishes the encoding model 21 and the generative model 40 by way of the training processing Sc that uses a plurality of training data T. FIG. 8 is a flow chart illustrating example procedures of the training processing Sc. For example, the training processing Sc is started in response to an operation to the input device 14 by the user.

Once the training processing Sc is started, the training processor 62 selects a predetermined number of training data T (hereinafter, referred to as "selected training data T") from among the plurality of training data T stored in the storage device 12 (Sc11). The predetermined number of selected training data T constitute a single batch. The training processor 62 supplies the music data D of the selected training data T to a tentative encoding model 21 (Sc12). The encoding model 21 generates symbol data B for each symbol based on the music data D supplied by the training processor 62. The encoded data acquirer 22 generates the encoded data E for each time step τ based on the symbol data B for each symbol. A tempo Z2 that the encoded data acquirer 22 uses for the acquisition of the encoded data E is set to a predetermined reference value. In addition, the training processor 62 sequentially supplies each of control data C of the selected training data T to a tentative generative model 40 (Sc13). By the procedures described above, the input data Y, which includes the encoded data E and the control data C and past acoustic feature data F, is supplied to the generative model 40 for each time step τ. The generative model 40 generates, for each time step τ, acoustic feature data F that reflects the input data Y. Noise components may be added to the past acoustic feature data F generated by the generative model 40, and the past acoustic feature data F to which the noise component is added may be included in the input data Y, to prevent or reduce overfitting of the machine-learning.

The training processor 62 calculates a loss function that indicates a difference between the time series of acoustic feature data F generated by the tentative generative model 40 and the time series of the acoustic feature data F included in the selected training data T (in other words, ground truths) (Sc14). The training processor 62 repeatedly updates a set of variables of the encoding model 21 and a set of variables of the generative model 40 so that the loss function is reduced (Sc15). For example, known backpropagation method is used to update these variables in accordance with the loss function.

It is of note that the set of variables of the generative model 40 is updated for each time step τ, whereas the set of variables of the encoding model 21 is updated for each symbol. Specifically, the sets of variables are updated in accordance with procedure 1 to procedure 3 described below.

[Procedure 1]

The training processor 62 updates the set of variables of the generative model 40 by backpropagation of a loss function corresponding to the encoded data E of each time step τ. By execution of procedure 1, a loss function related to the generative model 40 is obtained.

[Procedure 2]

The training processor 62 converts the loss function corresponding to the encoded data E of each time step into a loss function corresponding to the symbol data B of each symbol. The mapping information is used in the conversion of the loss functions.

[Procedure 3]

The training processor 62 updates the set of variables of the encoding model 21 by backpropagation of the loss function corresponding to the symbol data B of each symbol.

The training processor 62 judges whether an end condition of the training processing Sc has been satisfied (Sc16). The end condition is, for example, the loss function falling below a predetermined threshold or an amount of change of the loss function falling below a predetermined threshold. In actuality, the judgement can be prevented from being affirmative unless the number of repeated updates of the set of variables using the plurality of training data T reaches a predetermined value (in other words, for each epoch). A loss function calculated using the training data T may be used to determine whether the end condition has been satisfied. However, a loss function calculated from test data prepared separately from the training data T may be used to determine whether the end condition has been satisfied.

If the judgement is negative (Sc16: NO), the training processor 62 selects a predetermined number of unselected training data T from the plurality of training data T stored in the storage device 12 as newly selected training data T (Sc11). Thus, until the end condition is satisfied and the judgement becomes affirmative (Sc16: YES), the selection of the predetermined number of training data T (Sc11), the calculation of loss functions (Sc12 to Sc14), and the update of the sets of variables (Sc15) are each performed repeatedly. When the judgement is affirmative (Sc16: YES), the training processor 62 terminates the training processing Sc. Upon the termination of the training processing Sc, the encoding model 21 and the generative model 40 are established.

As established by the training processing Sc described above, the encoding model 21 can generate symbol data B, appropriate for the generation of the acoustic feature data F, from unseen music data D, and the generative model 40 can generate the statistically proper acoustic feature data F from the encoded data E.

It is of note that the trained generative model 40 may be re-trained using a time series of control data C that is separate from the time series of the control data C in the training data T used in the training processing Sc exemplified above. In the re-training of the generative model 40, the set of variables, which defines the encoding model 21, need not be updated.

B: Second Embodiment

A second embodiment will now be described below. Elements in each mode exemplified below that have functions similar to those of the elements in the first embodiment will be denoted by reference signs similar to those in the first embodiment and detailed description of such elements will be omitted, as appropriate.

Figure 9:
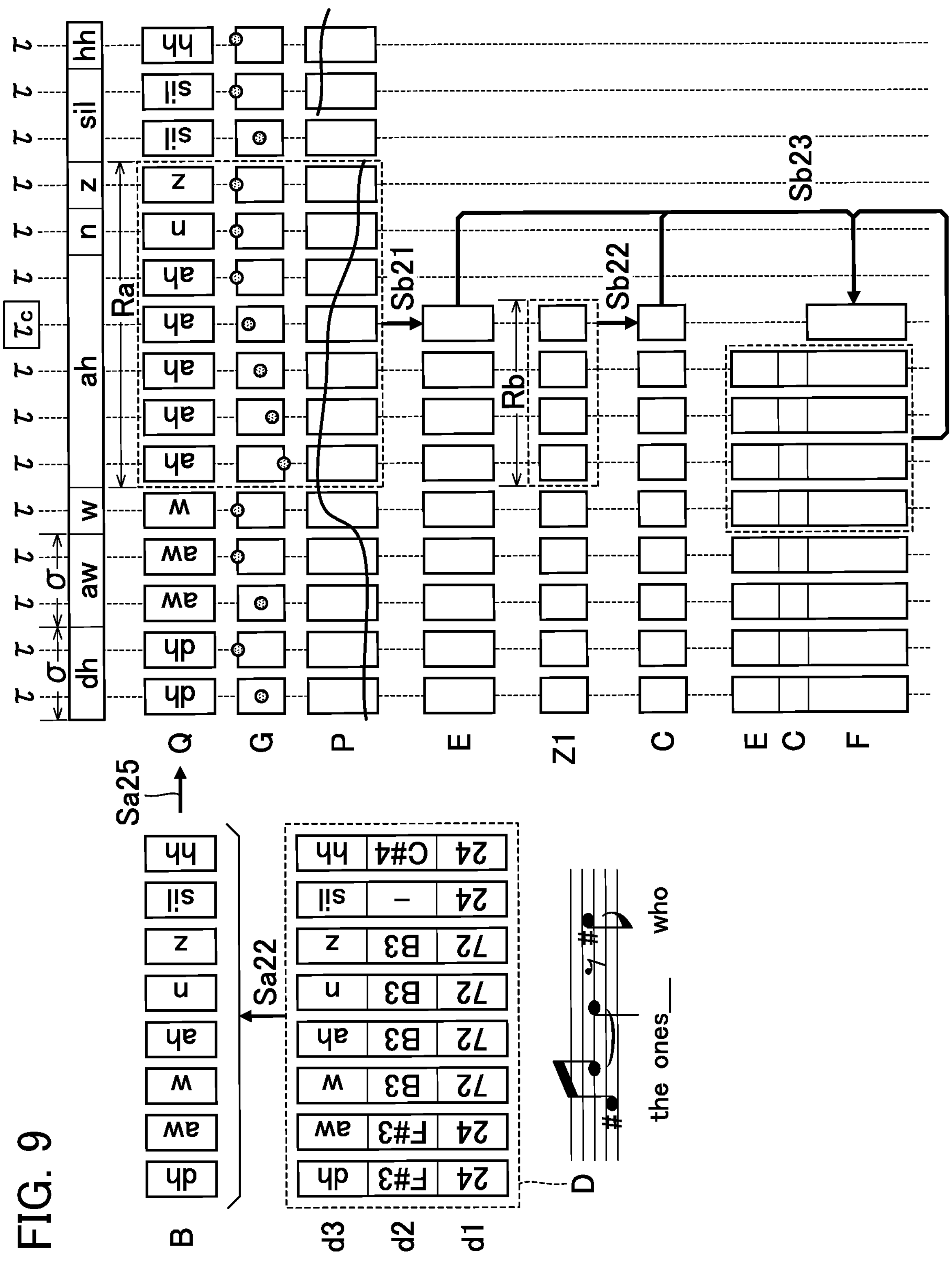
FIG. 9 is an explanatory diagram of an operation of an audio processing system according to a second embodiment.

Similar to the first embodiment illustrated in FIG. 1, an audio processing system 100 according to the second embodiment includes a control device 11, a storage device 12, a sound output device 13, and an input device 14. Also, similar to the first embodiment, music data D is stored in the storage device 12. FIG. 9 is an explanatory diagram of an operation of the audio processing system 100 according to the second embodiment. In the second embodiment, an example is given of a case in which a singing voice is synthesized using the music data D, which is used for synthesis of a singing voice in the first embodiment. The music data D designates, for each phoneme in a tune, a duration d1, a pitch d2, and a phoneme code d3. It is of note that the second embodiment can also be applied to synthesis of an instrumental sound.

Figure 10:
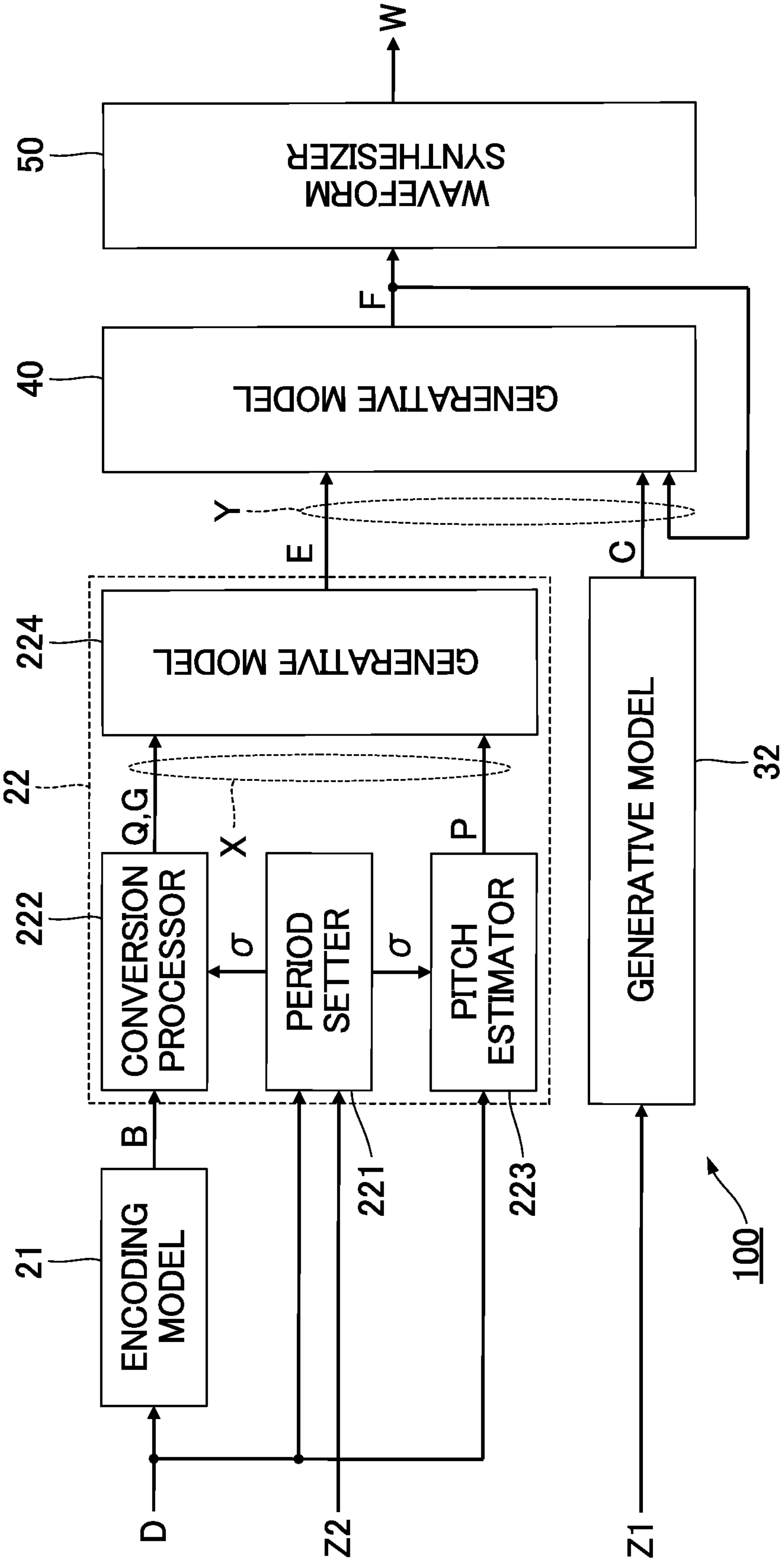
FIG. 10 is a block diagram illustrating a functional configuration of the audio processing system.

FIG. 10 is a block diagram illustrating a functional configuration of the audio processing system 100 according to the second embodiment. By executing a program stored in the storage device 12, the control device 11 according to the second embodiment implements a plurality of a functions (the encoding model 21, the encoded data acquirer 22, a generative model 32, the generative model 40, and the waveform synthesizer 50) for generating an audio signal W from music data D.

The encoding model 21 is a statistical estimation model for generating a series of symbol data B from the music data D in a manner similar to that of the first embodiment. Specifically, the encoding model 21 is a trained model that learns a relationship between the music data D and the symbol data B. As illustrated at step Sa22 in FIG. 9, the encoding model 21 generates the symbol data B for each of phonemes present in lyrics of a tune. Thus, a plurality of symbol data B corresponding to different symbols in the tune is generated by the encoding model 21. Similar to the first embodiment, the encoding model 21 may be a deep neural network of any architecture.

Similar to the symbol data B in the first embodiment, a single piece of symbol data B corresponding to a single phoneme is affected not only by features (the duration d1, the pitch d2, and the phoneme code d3) of the phoneme but also by features of phonemes preceding the phoneme (past phonemes) and features of phonemes succeeding the phoneme in the tune (future phonemes). A series of the symbol data B for the entire tune is generated from the music data D. The series of the symbol data B generated by the encoding model 21 is stored in the storage device 12.

In a manner similar to that in the first embodiment, the encoded data acquirer 22 sequentially acquires the encoded data E at each of time steps τ on the time axis. The encoded data acquirer 22 according to the second embodiment includes a period setter 221, a conversion processor 222, a pitch estimator 223, and a generative model 224. In a manner similar to that in the first embodiment, the period setter 221 in FIG. 10 determines a length of a unit period σ based on the music data D and a tempo Z2. The unit period σ corresponds to a duration in which each phoneme in the tune is sounded.

As illustrated in FIG. 9, the conversion processor 222 acquires intermediate data Q at each of the time steps τ on the time axis. The intermediate data Q corresponds to the encoded data E in the first embodiment. Specifically, the conversion processor 222 selects each of the time steps τ as a current step τc in a chronological order of the time series and generates the intermediate data Q for the current step τc. In other words, by using the mapping information, i.e., a result of determination of each unit period σ by the period setter 221, the conversion processor 222 converts the symbol data B for each symbol stored in the storage device 12 into the intermediate data Q for each time step τ on the time axis. Thus, by using the symbol data B generated by the encoding model 21 and the mapping information generated by the period setter 221, the encoded data acquirer 22 generates the intermediate data Q for each time step τ on the time axis. A piece of symbol data B corresponding to one symbol is expanded for the intermediate data Q corresponding to one or more time steps τ. For example, in FIG. 9, the symbol data B corresponding to a phoneme /w/ is converted into intermediate data Q of a single time step τ that constitutes a unit period σ set by the period setter 221 for the phoneme /w/. The symbol data B corresponding to a phoneme /ah/ is converted into five intermediate data Q that correspond to five time steps τ, which together constitute a unit period σ set by the period setter 221 for the phoneme /ah/.

Furthermore, the conversion processor 222 generates position data G for each of the time steps τ. Position data G of a single time step τ represents, by a proportion relative to the unit period σ a temporal position in the unit period σ of the intermediate data Q corresponding to the time step τ. For example, the position data G is set to "0" when the position of the intermediate data Q is at the beginning of the unit period σ, and the position data G is set to "1" when the position is at the end of the unit period σ. When focusing on two time steps τ among the five time steps τ included in the unit period σ of the phoneme /A/ in FIG. 9, as compared to the position data G of an earlier time step τ of the two time steps τ, the position data G of a later time step τ of the two time steps τ designates a later time point of the unit period σ. For example, for a last time step τ in a single unit period σ, position data G representing the end of the unit period σ is generated.

The pitch estimator 223 in FIG. 10 generates pitch data P for each of the time steps τ. A piece of pitch data P corresponding to one time step τ represents a pitch of a synthesis sound in the time step τ. The pitch d2 designated by the music data D represents a pitch of each symbol (for example, a phoneme), whereas the pitch data P represents, for example, a temporal change of the pitch in a period of a predetermined length including a single time step τ. Alternatively, the pitch data P may be data representing a pitch at, for example, a single time step τ. It is of note that the pitch estimator 223 may be omitted.

Specifically, the pitch estimator 223 generates pitch data P of each time step τ based on the pitch d2 and the like of each symbol of the music data D stored in the storage device 12 and the unit period σ set by the period setter 221 for each phoneme. A known analysis technique can be freely adopted to generate the pitch data P (in other words, to estimate a temporal change in pitch). For example, a function for estimating a temporal transition of pitch (a so-called pitch curve) using a statistical estimation model, such as a deep neural network or a hidden Markov model, is used as the pitch estimator 223.

As illustrated as step Sb21 in FIG. 9, the generative model 224 in FIG. 10 generates encoded data E at each of the time steps τ. The generative model 224 is a statistical estimation model that generates the encoded data E from input data X. Specifically, the generative model 224 is a trained model having learned a relationship between the input data X and the encoded data E. It is of note that the generative model 224 is an example of a "second generative model."

The input data X of the current step τc includes the intermediate data Q, the position data G, and the pitch data P, each of which corresponds to respective time steps τ in a period (hereinafter, referred to as a "reference period") Ra that has a predetermined length on the time axis. The reference period Ra is a period that includes the current step τc. Specifically, the reference period Ra includes the current step τc, a plurality of time steps τ positioned before the current step τc, and a plurality of time steps τ positioned after the current step τc. The input data X of the current step τc includes: the intermediate data Q associated with the respective time steps τ in the reference period Ra; and the position data G and the pitch data P generated for the respective time steps τ in the reference period Ra. The input data X is an example of "second input data." One or both of the position data G and the pitch data P may be omitted from the input data X. In the first embodiment, the position data G generated by the conversion processor 222 may be included in the input data Y similarly to the second embodiment.

As described earlier, the intermediate data Q of the current step τc is affected by the features of a tune in the current step τc and by the features of the tune in steps preceding and in steps succeeding the current step τc. Accordingly, the encoded data E generated from the input data X including the intermediate data Q is affected by the features (the duration d1, the pitch d2, and the phoneme code d3) of the tune in the current step τc and the features (the duration d1, the pitch d2, and the phoneme code d3) of the tune in steps preceding and in steps succeeding the current step τc. Moreover, in the second embodiment, the reference period Ra includes time steps τ that succeed the current step τc, i.e., future time steps τ. Therefore, compared to a configuration in which the reference period Ra only includes the current step τc, the features of the tune in steps that succeed the current step τc influence the encoded data E.

The generative model 224 may be a deep neural network. For example, a deep neural network with an architecture such as a non-causal convolutional neural network may be used as the generative model 224. A recurrent neural network may be used as the generative model 224, and the generative model 224 may include an additional element, such as a long short-term memory or self-attention. The generative model 224 exemplified above is implemented by a combination of a program that causes the control device 11 to carry out the generation of the encoded data E from the input data X and a set of variables (specifically, weighted values and biases) for application to the generation. The set of variables, which defines the generative model 224, is determined in advance by machine learning using a plurality of training data and is stored in the storage device 12.

As described above, in the second embodiment, the encoded data E is generated by supplying the input data X to a trained generative model 224. Therefore, statistically proper encoded data E can be generated under a latent relationship in a plurality of training data used in machine learning.

The generative model 32 in FIG. 10 generates control data C at each of the time steps τ. The control data C reflects an instruction (specifically, an indication value Z1 of a synthesis sound) provided in real time as a result of an operation carried out by the user on the input device 14, similarly to the first embodiment. In other words, the generative model 32 functions as an element (a control data acquirer) that acquires control data C at each of the time steps τ. It is of note that the generative model 32 in the second embodiment may be replaced with the control data acquirer 31 according to the first embodiment.

The generative model 32 generates the control data C from a series of indication values Z1 corresponding to multiple time steps τ in a predetermined period (hereinafter, referred to as a "reference period") Rb along the timeline. The reference period Rb is a period that includes the current step τc. Specifically, the reference period Rb includes the current step τc and time steps τ before the current step τc. Thus, the reference period Rb that influences the control data C does not include time steps τ that succeed the current step τc, whereas the earlier-described reference period Ra that affects the input data X includes time steps τ that succeed the current step τc.

The generative model 32 may comprise a deep neural network. For example, a deep neural network with an architecture, such as a causal convolutional neural network or a recurrent neural network, may be used as the generative model 32. An example of a recurrent neural network is a unidirectional recurrent neural network. The generative model 32 may include an additional element, such as a long short-term memory or self-attention. The generative model 32 exemplified above is implemented by a combination of a program that causes the control device 11 to carry out an operation to generate the control data C from a series of indication values Z1 in the reference period Rb and a set of variables (specifically, weighted values and biases) for application to the operation. The set of variables, which defines the generative model 32, is determined in advance by machine learning using a plurality of training data and is stored in the storage device 12.

As exemplified above, in the second embodiment, the control data C is generated from a series of indication values Z1 that reflect instructions from the user. Therefore, the control data C can be generated that varies in accordance with a temporal change in the indication values Z1 reflecting indications of the user. It is of note that the generative model 32 may be omitted. In this case, the indication values Z1 may be supplied as-are to the generative model 32 as the control data C. In place of the generative model 32, a low-pass filter may be used. In this case, a numerical value generated by smoothing of the indication values Z1 on the time axis may be supplied to the generative model 32 as the control data C.

The generative model 40 generates acoustic feature data F at each of the time steps τ, similarly to the first embodiment. In other words, a time series of the acoustic feature data F corresponding to different time steps τ is generated. The generative model 40 is a statistical estimation model that generates the acoustic feature data F from the input data Y. Specifically, the generative model 40 is a trained model that has learned a relationship between the input data Y and the acoustic feature data F.

The input data Y of the current step τc includes the encoded data E acquired by the encoded data acquirer 22 at the current step τc and the control data C generated by the generative model 32 at the current step τc. In addition, as illustrated in FIG. 9, the input data Y of the current step τc includes the acoustic feature data F generated by the generative model 40 at more than one time steps τ preceding the current step τc, and the encoded data E and the control data C of each of the more than one time steps τ.

As will be understood from the description given above, the generative model 40 generates the acoustic feature data F of the current step τc based on the encoded data E and the control data C of the current step τc and the acoustic feature data F of past time steps τ. In the second embodiment, the generative model 224 functions as an encoder that generates the encoded data E, and the generative model 32 functions as an encoder that generates the control data C. In addition, the generative model 40 functions as a decoder that generates the acoustic feature data F from the encoded data E and the control data C. The input data Y is an example of the "first input data."

The generative model 40 may be a deep neural network in a similar manner to the first embodiment. For example, a deep neural network with any architecture, such as a causal convolutional neural network or a recurrent neural network, may be used as the generative model 40. An example of the recurrent neural network is a unidirectional recurrent neural network. The generative model 40 may include an additional element, such as a long short-term memory or self-attention. The generative model 40 exemplified above is implemented by a combination of a program that causes the control device 11 to execute the generation of the acoustic feature data F from the input data Y and a set of variables (specifically, weighted values and biases) to be applied to the generation. The set of variables, which defines the generative model 40, is determined in advance by machine learning using a plurality of training data and is stored in the storage device 12. It is of note that the generative model 32 may be omitted in a configuration where the generative model 40 is a recurrent model (autoregressive model). In addition, recursiveness of the generative model 40 may be omitted in a configuration that includes the generative model 32.

The waveform synthesizer 50 generates an audio signal W of a synthesis sound from a time series of the acoustic feature data F in a similar manner to the first embodiment. By supplying the sound output device 13 with the audio signal W generated by the waveform synthesizer 50, a synthesis sound is produced from the sound output device 13.

Figure 11:
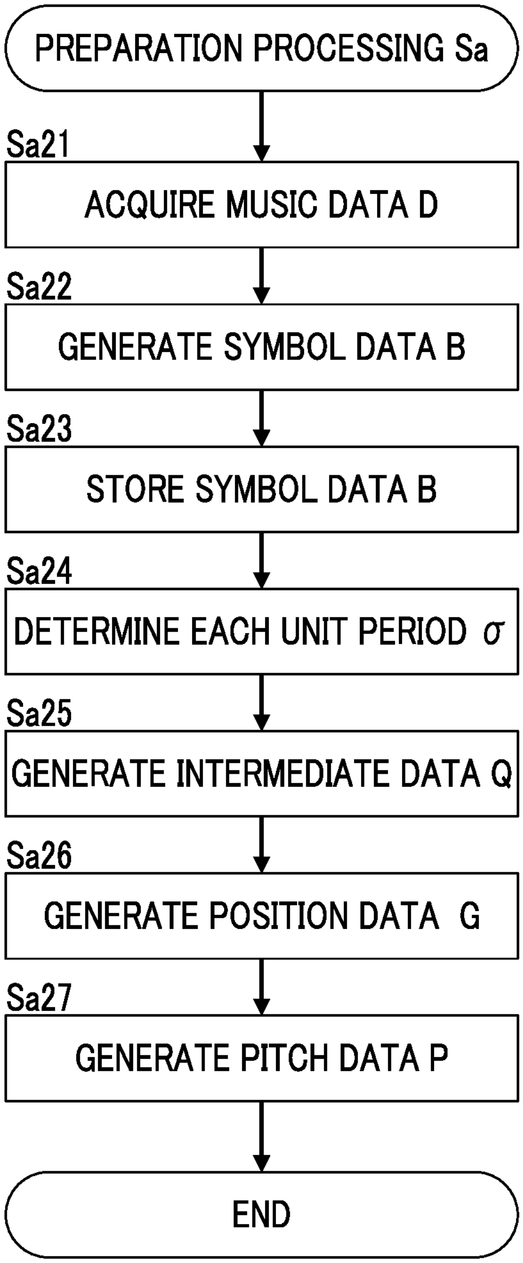
FIG. 11 is a flow chart illustrating example procedures of preparation processing.

FIG. 11 is a flow chart illustrating example procedures of preparation processing Sa according to the second embodiment. The preparation processing Sa is executed each time the music data D is updated in a similar manner to the first embodiment. For example, each time the music data D is updated in response to an edit instruction from the user, the control device 11 executes the preparation processing Sa using the updated music data D.

Once the preparation processing Sa is started, the control device 11 acquires music data D from the storage device 12 (Sa21). The control device 11 generates symbol data B corresponding to different phonemes in the tune by supplying the music data D to the encoding model 21 (Sa22). Specifically, a series of the symbol data B for the entire tune is generated. The control device 11 stores the series of symbol data B generated by the encoding model 21 in the storage device 12 (Sa23).

The control device 11 (the period setter 221) determines a unit period σ of each phoneme in the tune based on the music data D and the tempo Z2 (Sa24). As illustrated in FIG. 9, the control device 11 (the conversion processor 222) generates, based on symbol data B stored in the storage device 12 for each of phonemes, one or more intermediate data Q of one or more time steps τ constituting a unit period σ that corresponds to the phoneme (Sa25). In addition, the control device 11 (the conversion processor 222) generates position data G for each of the time steps τ (Sa26). The control device 11 (the pitch estimator 223) generates pitch data P for each of the time steps τ (Sa27). As will be understood from the description given above, a set of the intermediate data Q, the position data G, and the pitch data P is generated for each time step τ over the entire tune, before executing the synthesis processing Sb.

An order of respective processing steps that constitute the preparation processing Sa is not limited to the order exemplified above. For example, the generation of the pitch data P (Sa27) for each time step τ may be executed before executing the generation of the intermediate data Q (Sa25) and the generation of the position data G (Sa26) for each time step τ.

Figure 12:
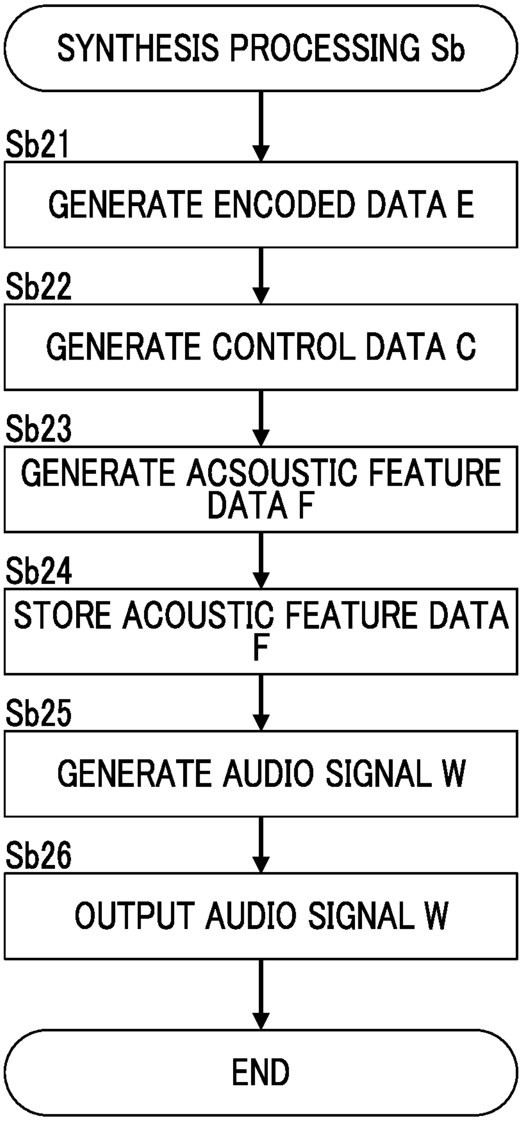
FIG. 12 is a flow chart illustrating example procedures of synthesis processing.

FIG. 12 is a flow chart illustrating example procedures of synthesis processing Sb according to the second embodiment. The synthesis processing Sb is executed for each of the time steps τ after the execution of the preparation processing Sa. In other words, each of the time steps τ is selected as a current step τc in a chronological order of the time series and the following synthesis processing Sb is executed for the current step τc.

Once the synthesis processing Sb is started, the control device 11 (the encoded data acquirer 22) generates the encoded data E of the current step τc by supplying the input data X of the current step τc to the generative model 224 as illustrated in FIG. 9 (Sb21). The input data X of the current step τc includes the intermediate data Q, the position data G, and the pitch data P of each of the time steps τ constituting the reference period Ra. The control device 11 generates the control data C of the current step τc (Sb22). Specifically, the control device 11 generates the control data C of the current step τc by supplying a series of the indication values Z1 in the reference period Rb to the generative model 32.

The control device 11 generates acoustic feature data F of the current step τc by supplying the generative model 40 with input data Y of the current step τc (Sb23). As described earlier, the input data Y of the current step τc includes (i) the encoded data E and the control data C acquired for the current step τc; and (ii) the acoustic feature data F, the encoded data E, and the control data C generated for each of past time steps τ. The control device 11 stores the acoustic feature data F generated for the current step τc, in the storage device 12 together with the encoded data E and the control data C of the current step τc (Sb24). The acoustic feature data F, the encoded data E, and the control data C stored in the storage device 12 are used in the input data Y in next and subsequent executions of the synthesis processing Sb.

The control device 11 (the waveform synthesizer 50) generates a series of samples of the audio signal W from the acoustic feature data F of the current step τc (Sb25). The control device 11 then supplies the audio signal W generated with respect to the current step τc to the sound output device 13 (Sb26). By repeatedly performing the synthesis processing Sb exemplified above for each time step τ, synthesis sounds for the entire tune are produced from the sound output device 13, similarly to the first embodiment.

As described above, also in the second embodiment, the acoustic feature data F is generated using the encoded data E that reflects features of phonemes of time steps that succeed the current step τc in the tune and the control data C that reflects an instruction by the user for the current step τc, similarly to the first embodiment. Therefore, it is possible to generate the acoustic feature data F of a synthesis sound that reflects features of the tune in time steps that succeed the current step τc (future time steps Tc) and a real-time instruction by the user.

Further, the input data Y used to generate the acoustic feature data F includes acoustic feature data F of past time steps τ in addition to the control data C and the encoded data E of the current step τc. Therefore, the acoustic feature data F of a synthesis sound in which a temporal transition of acoustic features sounds natural can be generated, similarly to the first embodiment.

In the second embodiment, the encoded data E of the current step τc is generated from the input data X including two or more intermediate data Q respectively corresponding to time steps τ including the current step τc and a time step τ succeeding the current step τc. Therefore, compared to a configuration in which the encoded data E is generated from intermediate data Q corresponding to one symbol, it is possible to generate a time series of the acoustic feature data F in which a temporal transition of acoustic features sounds natural.

In addition, in the second embodiment, the encoded data E is generated from the input data X, which includes position data G representing which temporal position in the unit period σ the intermediate data Q corresponds to and pitch data P representing a pitch in each time step τ. Therefore, a series of the encoded data E that appropriately represents temporal transitions of phonemes and pitch can be generated.

Figure 13:
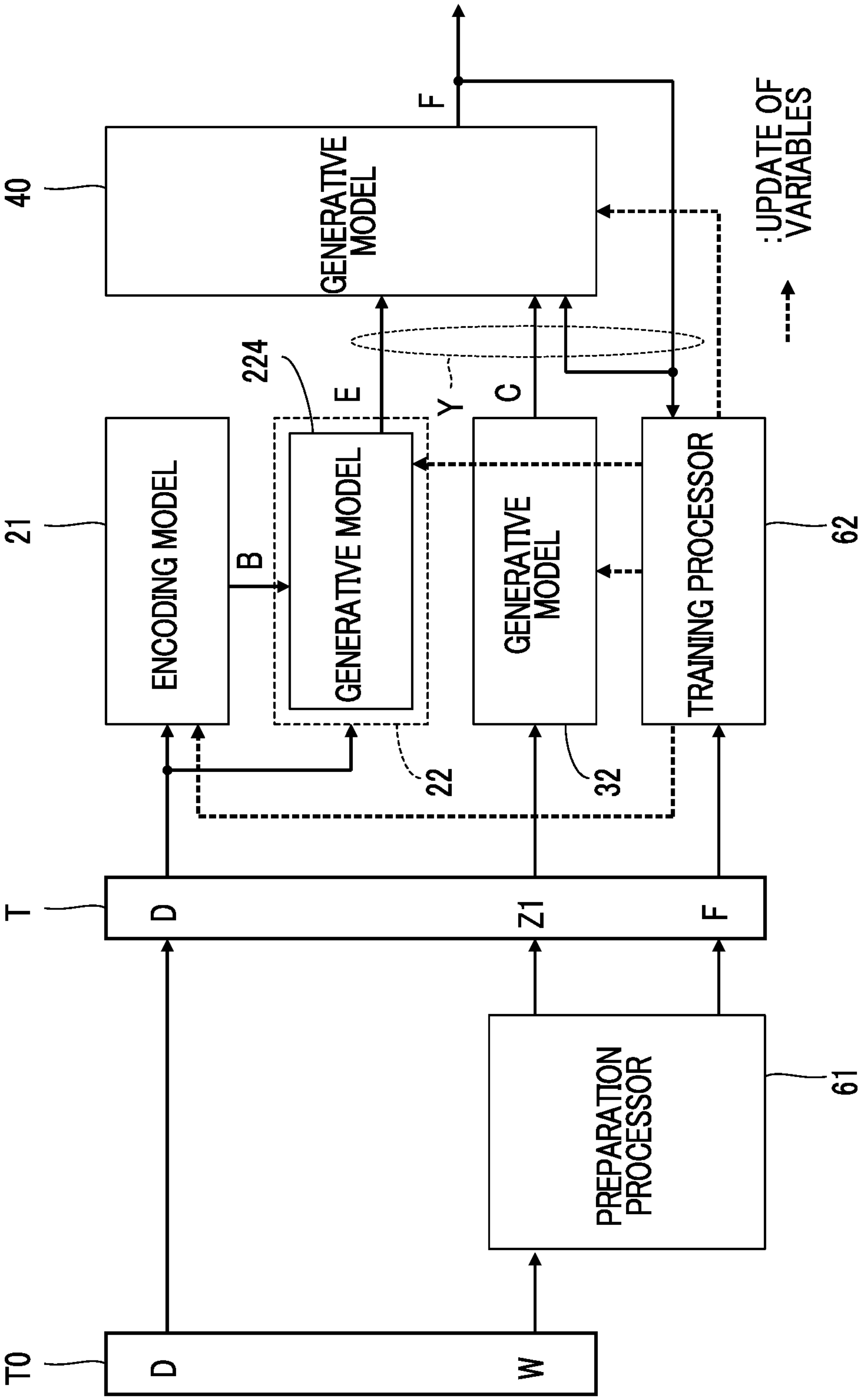
FIG. 13 is an explanatory diagram of training processing.

FIG. 13 is an explanatory diagram of training processing Sc in the second embodiment. The training processing Sc according to the second embodiment is a kind of supervised machine learning that uses a plurality of training data T to establish the encoding model 21, the generative model 224, the generative model 32, and the generative model 40. Each of the plurality of training data T includes music data D, a series of indication values Z1, and a time series of acoustic feature data F. The acoustic feature data F of each training data T is ground truth data representing acoustic features (for example, frequency characteristics) of a synthesis sound to be generated from the corresponding music data D and the indication values Z1 of the training data T.

By executing a program stored in the storage device 12, the control device 11 functions as a preparation processor 61 and a training processor 62 in addition to each element illustrated in FIG. 10. The preparation processor 61 generates training data T from reference data T0 stored in the storage device 12 in a similar manner to the first embodiment. Each piece of reference data T0 includes a piece of music data D and an audio signal W. The audio signal W in each piece reference data T0 represents a waveform of a reference sound (for example, a singing voice) corresponding to the piece of music data D in the piece of reference data T0.

By analyzing the audio signal W of each piece of reference data T0, the preparation processor 61 generates a series of indication values Z1 and a time series of acoustic feature data F of the training data T. For example, the preparation processor 61 calculates a series of indication values Z1, each value of which represents an intensity of the reference sound by analyzing the audio signal W. In addition, the preparation processor 61 calculates a time series of frequency characteristics of the audio signal W and generates a time series of acoustic feature data F representing the frequency characteristics for the respective time steps τ in a similar manner to the first embodiment. The preparation processor 61 generates the training data T by associating with the piece of music data D, using mapping information, the series of the indication values Z1 and the time series of the acoustic feature data F generated by the procedures described above.

Figure 14:
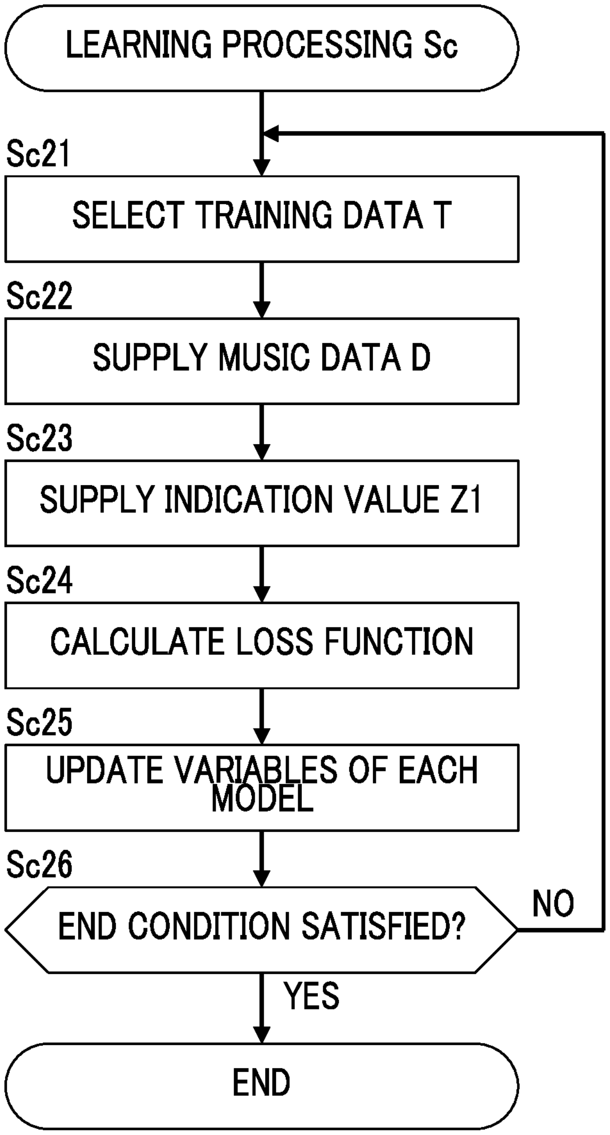
FIG. 14 is a flow chart illustrating example procedures of the training processing.

The training processor 62 establishes the encoding model 21, the generative model 224, the generative model 32, and the generative model 40 by the training processing Sc using the plurality of training data T. FIG. 14 is a flow chart illustrating example procedures of the training processing Sc according to the second embodiment. For example, the training processing Sc is started in response to an instruction with respect to the input device 14.

Once the training processing Sc is started, the training processor 62 selects, as selected training data T, a predetermined number of training data T among the plurality of training data T stored in the storage device 12 (Sc21). The training processor 62 supplies music data D of the selected training data T to a tentative encoding model 21 (Sc22). The encoding model 21, the period setter 221, the conversion processor 222, and the pitch estimator 223 perform processing based on the music data D, and input data X for each time step τ is generated as a result. A tentative generative model 224 generates the encoded data E in accordance with each input data X for each time step τ. A tempo Z2 that the period setter 221 uses for the determination of the unit period σ is set to a predetermined reference value.

In addition, the training processor 62 supplies the indication values Z1 of the selected training data T to a tentative generative model 32 (Sc23). The generative model 32 generates control data C for each time step τ in accordance with the series of the indication values Z1. As a result of the processing described above, the input data Y including the encoded data E, the control data C, and past acoustic feature data F is supplied to the generative model 40 for each time step τ. The generative model 40 generates the acoustic feature data F in accordance with the input data Y for each time step τ.

The training processor 62 calculates a loss function indicating a difference between the time series of the acoustic feature data F generated by the tentative generative model 40 and the time series of the acoustic feature data F included in the selected training data T (i.e., ground truths) (Sc24). The training processor 62 repeatedly updates the set of variables of each of the encoding model 21, the generative model 224, the generative model 32, and the generative model 40 so that the loss function is reduced (Sc25). For example, a known backpropagation method is used to update these variables in accordance with the loss function.

The training processor 62 judges whether or not an end condition related to the training processing Sc has been satisfied in a similar manner to the first embodiment (Sc26). When the end condition is not satisfied (Sc26: NO), the training processor 62 selects a predetermined number of unselected training data T from the plurality of training data T stored in the storage device 12 as new selected training data T (Sc21). Thus, until the end condition is satisfied (Sc26: YES), the selection of the predetermined number of training data T (Sc21), the calculation of a loss function (Sc22 to Sc24), and the update of the sets of variables (Sc25) are repeatedly performed. When the end condition is satisfied (Sc26: YES), the training processor 62 terminates the training processing Sc. Upon the termination of the training processing Sc, the encoding model 21, the generative model 224, the generative model 32, and the generative model 40 are established.

According to the encoding model 21 established by the training processing Sc exemplified above, the encoding model 21 can generate symbol data B appropriate for the generation of acoustic feature data F that is statistically proper relative to hidden music data D. In addition, the generative model 224 can generate encoded data E appropriate for the generation of acoustic feature data F that is statistically proper with respect to the music data D. In a similar manner, the generative model 32 can generate control data C appropriate for the generation of acoustic feature data F that is statistically proper relative to the music data D.

C: Modifications

Examples of modifications that can be made to the embodiments described above will now be described. Two or more aspects freely selected from the following examples may be combined in so far as they do not contradict each other.

(1) The second embodiment exemplifies a configuration for generating an audio signal W of a singing voice. However, the second embodiment is similarly applied to the generation of an audio signal W of an instrumental sound. In a configuration for synthesizing an instrumental sound, the music data D designates the duration d1 and the pitch d2 for each of a plurality of notes that constitute a tune as described earlier in the first embodiment. In other words, the phoneme code d3 is omitted from the music data D.

(2) The acoustic feature data F may be generated by selectively using any one of a plurality of generative models 40 established using different sets of training data T. For example, the training data T used in the training processing Sc of each one of the plurality of generative models 40 is established using corresponding audio signals W of reference sounds sung by one of different singers or produced by playing one of different instruments. The control device 11 generates the acoustic feature data F using a generative model 40 corresponding to a singer or an instrument selected by the user from among the established generative models 40.

(3) Each embodiment above exemplifies the indication value Z1 representing an intensity of a synthesis sound. However, the indication value Z1 is not limited to the intensity. The indication value Z1 may be any one of numerical values that affect conditions of a synthesis sound. For example, an indication value Z1 may represent any one of a depth (amplitude) of vibrato to be added to the synthesis sound, a period of the vibrato, a temporal intensity change in an attack part immediately after the onset of the synthesis sound (a attack speed of the synthesis sound), a tone color (for example, clarity of articulation) of the synthesis sound, a tempo of the synthesis sound, and an identification code of a singer of the synthesis sound, or an instrument played to produce the synthesis sound.

By analyzing the audio signal W of the reference sound included in the reference data T0 in the generation of the training data T, the preparation processor 61 can calculate a series of each indication value Z1 exemplified above. For example, an indication value Z1 representing the depth or the period of vibrato of the reference sound is calculated from a temporal change in frequency characteristics of the audio signal W. An indication value Z1 representing the temporal intensity change in the attack part of the reference sound is calculated from a time-derivative value of signal intensity or a time-derivative value of a basic frequency of the audio signal W. An indication value Z1 representing the tone color of the synthesis sound is calculated from an intensity ratio between frequency bands in the audio signal W. An indication value Z1 representing the tempo of the synthesis sound is calculated by a known beat detection technique or a known tempo detection technique. An indication value Z1 representing the tempo of the synthesis sound may be calculated by analyzing a periodic indication (for example, a tap operation) by a creator. In addition, an indication value Z1 representing the identification code of a singer or a played instrument of the synthesis sound is set in accordance with, for example, a manual operation by the creator. Furthermore, an indication value Z1 in the training data T may be set from performance information representing musical performance included in the music data D. For example, the indication value Z1 is calculated from various kinds of performance information (velocity, modulation wheel, vibrato parameters, foot pedal, and the like) in conformity with the MIDI standard.

(4) The second embodiment exemplifies a configuration in which the reference period Ra added to the input data X includes multiple time steps τ preceding a current step τc and multiple time steps τ succeeding the current step τc. However, a configuration in which the reference period Ra includes a single time step τ immediately preceding or immediately succeeding the current step τc is conceivable. In addition, a configuration in which the reference period Ra includes only the current step τc is possible. In other words, the encoded data E of a current step τc may be generated by supplying the generative model 224 with the input data X including the intermediate data Q, the position data G, and the pitch data P of the current step τc.

(5) The second embodiment exemplifies a configuration in which the reference period Rb includes a plurality of time steps τ. However, a configuration in which the reference period Rb includes only the current step τc is possible. In other words, the generative model 32 generates control data C only from the indication value Z1 of the current step τc.

(6) The second embodiment exemplifies a configuration in which the reference period Ra includes time steps τ preceding and succeeding the current step τc. In this configuration, by using the generative model 224, the features preceding and the features succeeding the current step τc of a tune are reflected in the encoded data E, generated from the input data X including the intermediate data Q of the current step τc. Therefore, the intermediate data Q of each time step τ may reflects features of the tune only for the time step τ. In other words, the features of the tune preceding or succeeding the current step τc need not be reflected in the intermediate data Q of the current step τc.

For example, the intermediate data Q of the current step τc reflects features of a symbol corresponding to the current step τc, but does not reflect features of a symbol preceding or succeeding the current step τc. The intermediate data Q is generated from the symbol data B of each symbol. As described, the symbol data B represents features (for example, the duration d1, the pitch d2, and the phoneme code d3) of a symbol.

In the modification, the intermediate data Q may be generated directly from only single symbol data B. For example, the conversion processor 222 generates the intermediate data Q of each time step τ using the mapping information based on the symbol data B of each symbol. In the present modification, the encoding model 21 is not used to generate the intermediate data Q. Specifically, in step Sa22 in FIG. 11, the control device 11 directly generates the symbol data B corresponding to different phonemes in the tune from information (for example, the phoneme code d3) of the phonemes in the music data D. Thus, the encoding model 21 is not used to generate the symbol data B. However, the encoding model 21 may be used to generate the symbol data B according to the present modification.

In contrast to the second embodiment alone, in the present modification the reference period Ra is expanded so that features of one or more symbols positioned preceding or succeeding a symbol corresponding to the current step τc are reflected in the encoded data E. For example, the reference period Ra must be secured so as to extend over three seconds or longer preceding or succeeding the current step τc. On the other hand, the present modification has an advantage that the encoding model 21 can be omitted.

(7) Each embodiment above exemplifies a configuration in which the input data Y supplied to the generative model 40 includes the acoustic feature data F of past time steps τ. However, a configuration in which the input data Y of the current step τc includes the acoustic feature data F of a immediately-preceding time step τ is conceivable. In addition, a configuration in which past acoustic feature data F is fed back to input of the generative model 40 is not essential. In other words, the input data Y not including past acoustic feature data F may be supplied to the generative model 40. However, in a configuration in which past acoustic feature data F is not fed back, acoustic features of a synthesis sound may vary discontinuously. Therefore, to generate a natural-sounding, synthesis sound in which acoustic features vary continuously, a configuration in which past acoustic feature data F is fed back into input of the generative model 40 is preferable.

(8) Each embodiment above exemplifies a configuration in which the audio processing system 100 includes the encoding model 21. However, the encoding model 21 may be omitted. For example, a series of symbol data B may be generated from music data D using an encoding model 21 of an external apparatus other than the audio processing system 100, and the generated symbol data B may be stored in the storage device 12 of the audio processing system 100.

(9) In each embodiment above, the encoded data acquirer 22 generates the encoded data E. However, the encoded data E may be acquired by an external apparatus, and the encoded data acquirer 22 may receive the acquired encoded data E from the external apparatus. In other words, the acquisition of the encoded data E includes both generation of the encoded data E and reception of the encoded data E.

(10) In each embodiment above, the preparation processing Sa is executed for the entirety of a tune. However, the preparation processing Sa may be executed for each of sections into which a tune is divided. For example, the preparation processing Sa may be executed for each of structural sections (for example, an intro., a first verse, a second verse, and a chorus) into which a tune is divided according to musical implication.

(11) The audio processing system 100 may be implemented by a server apparatus that communicates with a terminal apparatus, such as a mobile phone or a smartphone. For example, the audio processing system 100 generates an audio signal W based on instructions (indication values Z1 and tempos Z2) by a user received from the terminal apparatus and music data D stored in the storage device 12, and transmits the generated audio signal W to the terminal apparatus. In another configuration in which the waveform synthesizer 50 is implemented by the terminal apparatus, a time series of acoustic feature data F generated by the generative model 40 is transmitted from the audio processing system 100 to the terminal apparatus. In other words, the waveform synthesizer 50 is omitted from the audio processing system 100.

(12) The functions of the audio processing system 100 above are implemented by cooperation between one or a plurality of processors that constitute the control device 11 and a program stored in the storage device 12. The program according to the present disclosure may be stored in a computer-readable recording medium and installed in the computer. The recording medium is, a non-transitory recording medium, for example an optical recording medium (optical disk), such as a CD-ROM. However, any known medium, such as a semiconductor recording medium or a magnetic recording medium, is also usable. A non-transitory recording medium includes any medium with the exception of a transitory, propagating signal and even a volatile recording medium is not excluded. In addition, in a configuration in which a distribution apparatus distributes the program via a communication network, a storage device that stores the program in the distribution apparatus corresponds to the non-transitory recording medium.

D: Appendix

For example, the following configurations are derivable from the embodiments above.

An audio processing method according to an aspect (a first aspect) of the present disclosure includes, for each time step of a plurality of time steps on a time axis: acquiring encoded data that reflects current musical features of a tune for a current time step and musical features of the tune for succeeding time steps succeeding the current time step; acquiring control data according to a real-time instruction provided by a user; and generating acoustic feature data representative of acoustic features of a synthesis sound in accordance with first input data including the acquired encoded data and the acquired control data. In the aspect described above, the acoustic feature data is generated in accordance with a feature of a tune of a time step succeeding a current time step of the tune and control data according to an instruction provided by a user in the current time step. Therefore, acoustic feature data of a synthesis sound reflecting the feature at a later (future) point in the tune and a real-time instruction provided by the user can be generated.

The “tune” is represented by a series of symbols. Each of the symbols that constitute the tune is, for example, a music note or a phoneme. For each symbol there is designated at least one type of elements among different types of musical elements, such as a pitch, a sounding time point, and a volume. Accordingly, designation of a pitch in each symbol is not essential. In addition, for example, acquisition of encoded data includes conversion of encoded data using mapping information.

In an example (a second aspect) of the first aspect, the first input data of the current time step includes one or more acoustic feature data generated at one or more preceding time steps preceding the current time step, from among a plural pieces of acoustic feature data generated at the plurality of time steps. In the aspect described above, the first input data used to generate acoustic feature data includes acoustic feature data generated for one or more past time steps as well as the control data and the encoded data of the current time step. Therefore, it is possible to generate acoustic feature data of a synthesis sound in which a temporal transition of acoustic features sounds natural. In an example (a third aspect) of the first aspect or the second aspect, the acoustic feature data is generated by inputting the first input data to a trained first generative model. In the aspect described above, a trained first generative model is used to generate the acoustic feature data. Therefore, statistically proper acoustic feature data can be generated under a latent tendency of a plurality of training data used in machine learning of the first generative model.

In an example (a fourth aspect) of any one of the first to third aspects, the generating generates a time series of acoustic feature data at the plurality of time steps, and the method further comprises generating an audio signal representative of a waveform of the synthesis sound based on the generated time series of acoustic feature data. In the aspect described above, since the audio signal of the synthesis sound is generated from a time series of the acoustic feature data, the synthesis sound can be produced by supplying the audio signal to a sound output device.

In an example (a fifth aspect) of any one of the first to fourth aspects, the method further includes generating, from music data, a plurality of symbol data corresponding to a plurality of symbols in the tune, the music data representing a series of symbols that constitute the tune, each symbol data of the plurality of symbol data reflecting musical features of a symbol corresponding to the symbol data and musical features of another symbol succeeding the symbol in the tune; and converting the symbol data for each symbol into the encoded data for each time step. In some embodiments, each symbol data of the plurality of symbol data is generated by inputting a corresponding symbol in the music data and another symbol succeeding the corresponding symbol in the music data to a trained encoding model.

In an example (a sixth aspect) of any one of the first to fourth aspects, the method further includes generating, from music data, a plurality of symbol data corresponding to a plurality of symbols in the tune, the music data representing a series of symbols that constitute the tune, wherein each symbol of the plurality of symbol data reflects musical features of a symbol corresponding to the symbol data; converting the symbol data for each symbol into intermediate data for one or more time steps; and generating the encoded data at the current time step based on second input data including two or more intermediate data corresponding to two or more time steps including the current time step and another time step succeeding the current time step. In the configuration described above, the encoded data of a current time step is generated from second input data including two or more intermediate data respectively corresponding to two or more time steps including the current time step and a time step succeeding the current time step. Therefore, compared to a configuration in which the encoded data is generated from a single piece of intermediate data corresponding to one symbol, it is possible to generate a time series of acoustic feature data in which a temporal transition of acoustic features sounds natural.

In an example (a seventh aspect) of the sixth aspect, the encoded data is generated by inputting the second input data to a trained second generative model. In the aspect described above, the encoded data is generated by supplying the second input data to the trained second generative model. Therefore, statistically proper encoded data can be generated under a latent tendency among a plurality of training data used in machine learning.

In an example (an eighth aspect) of the sixth aspect or the seventh aspect, the converting of the symbol data to the intermediate data for one or more time steps is based on each of the plurality of symbol data, the one or more time steps constituting a unit period during which a symbol corresponding to the symbol data is sounded, and the second input data further includes: position data representing which temporal position, in the unit period, each of the two or more intermediate data corresponds to; and pitch data representing a pitch in each of the two or more time steps. In the aspect described above, the encoded data is generated from second input data that includes (i) position data representing a temporal position of the intermediate data in the unit period, during which the symbol is sounded, and (ii) pitch data representing a pitch in each time step. Therefore, a series of the encoded data that appropriately represents temporal transitions of symbols and pitch can be generated.

In an example (a ninth aspect) of any one of the first to fourth aspects, the method further includes generating intermediate data, at the current time step, reflecting musical features of a symbol that corresponds to the current time step among a series of symbols that constitute the tune; and generating the encoded data based on second input data including two or more pieces of intermediate data corresponding to, among the plurality of time steps, two or more time steps including the current time step and another time step succeeding the current time step. In some embodiments, the encoded data is generated by inputting the second input data to a trained second generative model.

In an example (a tenth aspect) of any one of the sixth to ninth aspects, the method further includes generating the control data based on a series of indication values provided by the user. In the aspect described above, since the control data is generated based on a series of indication values in response to instructions provided by the user, control data that appropriately varies in accordance with a temporal change in indication values that reflect instructions provided by the user can be generated.

An acoustic processing system according to an aspect (an eleventh aspect) of the present disclosure includes: one or more memories storing instructions; and one or more processors that implements the instructions to perform a plurality of tasks, including, for each time step of a plurality of time steps on a time axis: an encoded data acquiring task that acquires encoded data that reflects current musical features of a tune for a current time step and musical features of the tune for succeeding time steps succeeding the current time step; a control data acquiring task that acquires control data according to a real-time instruction provided by a user; and an acoustic feature data generating task that generates acoustic feature data representative of acoustic features of a synthesis sound in accordance with first input data including the acquired encoded data and the acquired control data.

A computer-readable recording medium according to an aspect (a twelfth aspect) of the present disclosure stores a program executable by a computer to execute an audio processing method comprising, for each time step of a plurality of time steps on a time axis: acquiring encoded data that reflects current musical features of a tune for a current time step and musical features of the tune for succeeding time steps succeeding the current time step; acquiring control data according to a real-time instruction provided by a user; and generating acoustic feature data representative of acoustic features of a synthesis sound in accordance with first input data including the acquired encoded data and the acquired control data.

DESCRIPTION OF REFERENCE SIGNS

100 Audio processing system
11 Control device
12 Storage device
13 Sound output device
14 Input device
21 Encoding model
22 Encoded data acquirer
221 Period setter
222 Conversion processor
223 Pitch estimator
224 Generative model
31 Control data acquirer
32 Generative model
40 Generative model
50 Waveform synthesizer
61 Preparation processor
62 Training processor

The invention claimed is:

1. A computer-implemented audio processing method comprising, for each current time step of a plurality of time steps on a time axis of a tune:

generating, from a series of symbol data, current encoded data that corresponds to current musical features of the tune for the current time step and succeeding musical features of the tune for at least one succeeding time step succeeding the current time step;

acquiring control data for the current time step in real time according to a real-time instruction provided by a user;

generating acoustic feature data representing frequency characteristics of a synthesis sound for the current time step in accordance with first input data for the current time step, the first input data including the current encoded data and the control data acquired for the current time step; and generating, for the current time step, samples of an audio signal representing a waveform of the synthesis sound from the acoustic feature data generated for the current time step in parallel with acquiring of the control data in real time according to the real-time instructions provided by the user.

2. The audio processing method according to claim 1, wherein the first input data for the current time step includes at least one acoustic feature data generated for at least one preceding time step preceding the current time step, from among a plural pieces of acoustic feature data generated at the plurality of time steps.

3. The audio processing method according to claim 2, wherein:

the first input data for each current time step is processed by a generative model to generate the acoustic feature data, and the generated acoustic feature data is fed back to the generative model for each current time step.

4. The audio processing method according to claim 1, wherein the first input data, which includes the current encoded data and the control data for the current time step is processed by a trained generative model to generate the acoustic feature data for the current time.

5. The audio processing method according to claim 1, further comprising generating the audio signal representing the waveforms of the synthesis sound based on the generated time series of acoustic feature data.

6. The audio processing method according to claim 1, further comprising:

generating, from music data, the series of symbol data corresponding to a plurality of symbols in the tune, the music data representing a series of symbols that constitute the tune, wherein each symbol data of the series of symbol data corresponds to musical features of a symbol corresponding to the symbol data and musical features of a succeeding symbol succeeding the symbol in the tune.

7. The audio processing method according to claim 6, further comprising:

converting the symbol data for each symbol into intermediate data for one or more time steps; and generating the encoded data at the current time step based on second input data including two or more intermediate data corresponding to two or more time steps including the current time step and the succeeding time step.

8. The audio processing method according to claim 7, wherein the current encoded data is generated by inputting the second input data to a trained generative model.

9. The audio processing method according to claim 7, wherein:

the converting of the symbol data to the intermediate data for one or more time steps is based on each of the series of symbol data, the one or more time steps constituting a unit period during which a symbol corresponding to the symbol data is sounded, the second input data further includes:

position data representing which temporal position, in the unit period, each of the two or more intermediate data corresponds to; and pitch data representing a pitch in each of the two or more time steps.

10. The audio processing method according to claim 7, further comprising generating the control data based on a series of indication values provided by the user.

11. The audio processing method according to claim 6, wherein each symbol data of the series of symbol data is generated by inputting a corresponding symbol in the music data and another symbol succeeding the corresponding symbol in the music data to a trained encoding model.

12. The audio processing method according to claim 6, wherein the musical features corresponding to each symbol among the series of symbols that constitute the tune represented by music data include a duration, a pitch and a phoneme code.

13. The audio processing method according to claim 6, wherein the current encoded data corresponds to the current musical features of a current symbol, among the series of symbols, corresponding to the current step, preceding musical features of a preceding symbol, among the series of symbols, corresponding to a preceding time step preceding the current time step, and the succeeding musical features of a succeeding symbol, among the series of symbols, corresponding to the succeeding time step.

14. The audio processing method according to claim 1, further comprising:

generating intermediate data, at the current time step, reflecting musical features of a symbol that corresponds to the current time step among the series of symbols that constitute the tune; and generating the current encoded data further based on second input data including two or more pieces of intermediate data corresponding to two or more time steps including the current time step and the succeeding time step.

15. The audio processing method according to claim 14, wherein the second input data is processed by a trained generative model to generate the current encoded data.

16. The audio processing method according to claim 1, further comprising, for each current time step of the plurality of time steps on the time axis of the tune, calculating, for the current time step, a read position in the tune.

17. The audio processing method according to claim 16, wherein the read position in the tune is in accordance with a tempo designated in real time by a user.

18. The audio processing method according to claim 1, wherein the control data represents an indication value and a tempo that continuously vary on the time axis responsive to real time instruction by the user.

19. An audio processing system comprising:

one or more memories storing instructions; and one or more processors that implements the instructions to perform a plurality of tasks, including, for each time step of a plurality of time steps on a time axis of a tune:

an encoded data generating task that generates, from a series of symbol data, current encoded data that reflects current musical features of the tune for the current time step and succeeding musical features of the tune for at least one succeeding time step succeeding the current time step;

a control data acquiring task that acquires control data for the current time step in real time according to a real-time instruction provided by a user;

an acoustic feature data generating task that generates acoustic feature data frequency characteristics of a synthesis sound for the current time step in accordance with first input data for the current time step, the first input data including the current encoded data and the control data acquired for the current time step; and an audio signal generating task that, for the current time step, generates samples of an audio signal representing a waveform of the synthesis sound from the acoustic feature data generated for the current time step in parallel with acquiring of the control data in real time according to the real-time instructions provided by the user.

20. A non-transitory computer-readable recording medium storing a program executable by a computer to execute an audio processing method comprising, for each current time step of a plurality of time steps on a time axis of a tune:

generating, from a series of symbol data, current encoded data that reflects current musical features of the tune for the current time step and succeeding musical features of the tune for at least one succeeding time step succeeding the current time step;

acquiring control data for the current time step in real time according to a real-time instruction provided by a user;

generating acoustic feature data representing frequency characteristics of a synthesis sound for the current time step in accordance with first input data for the current time step, the first input data including the current encoded data and the control data acquired for the current time step; and generating, for the current time step, samples of an audio signal representing a waveform of the synthesis sound from the acoustic feature data generated for the current time step in parallel with acquiring of the control data in real time according to the real-time instructions provided by the user.

* * * * *